United States Patent
Ueno et al.

(10) Patent No.: US 7,405,520 B2
(45) Date of Patent: Jul. 29, 2008

(54) CURVED LAMP MANUFACTURING METHOD, CURVED LAMP, AND BACKLIGHT UNIT

(75) Inventors: Hironobu Ueno, Takaishi (JP); Takaharu Yanata, Ibaraki (JP); Hayato Kameyama, Takatsuki (JP); Yoshimitsu Mino, Souraku-gun (JP); Akio Kikuchi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 601 days.

(21) Appl. No.: 11/084,674

(22) Filed: Mar. 18, 2005

(65) Prior Publication Data
US 2005/0231942 A1  Oct. 20, 2005

(30) Foreign Application Priority Data

| Mar. 22, 2004 | (JP) | ............................ 2004-083635 |
| Mar. 29, 2004 | (JP) | ............................ 2004-096767 |
| Mar. 30, 2004 | (JP) | ............................ 2004-100958 |

(51) Int. Cl.
*H01J 63/04* (2006.01)
*H01J 9/00* (2006.01)

(52) U.S. Cl. ........................ 313/634; 313/493

(58) Field of Classification Search ............... 313/634, 313/493
See application file for complete search history.

(56) References Cited

U.S. PATENT DOCUMENTS

| 4,298,822 | A  | * | 11/1981 | Fukuda ...................... 313/493 |
| 4,481,442 | A  | * | 11/1984 | Albrecht et al. ............. 313/493 |
| 7,285,899 | B2 | * | 10/2007 | Nishimura et al. .......... 313/485 |
| 2005/0258758 | A1 | * | 11/2005 | Boehme ...................... 313/634 |

FOREIGN PATENT DOCUMENTS

| JP | 57-152791 | 9/1982 |
| JP | 59-153330 | 10/1984 |
| JP | 03-187937 | 8/1991 |
| JP | 06-243782 | 9/1994 |
| JP | 2002-187730 | 7/2002 |

* cited by examiner

*Primary Examiner*—Nimeshkumar D. Patel
*Assistant Examiner*—Anthony T Perry

(57) ABSTRACT

A curved lamp manufacturing method including a curving process in which a straight glass tube sealed with reduced pressure inside is heated and curved. The curving process includes: a first step of holding a predetermined portion of the glass tube using a first chuck, and holding one end portion of the glass tube using a second chuck such that the second chuck can slide in a longitudinal direction of the glass tube; and a second step of, while heating a planned curved portion of the glass tube positioned between the predetermined portion and the end portion by a heater, curving the planned curved portion by moving the second chuck relative to the glass tube. The end portion is moved in the second step so that a weight of the end portion is applied to the planned curved portion that has been softened by the heater.

6 Claims, 20 Drawing Sheets

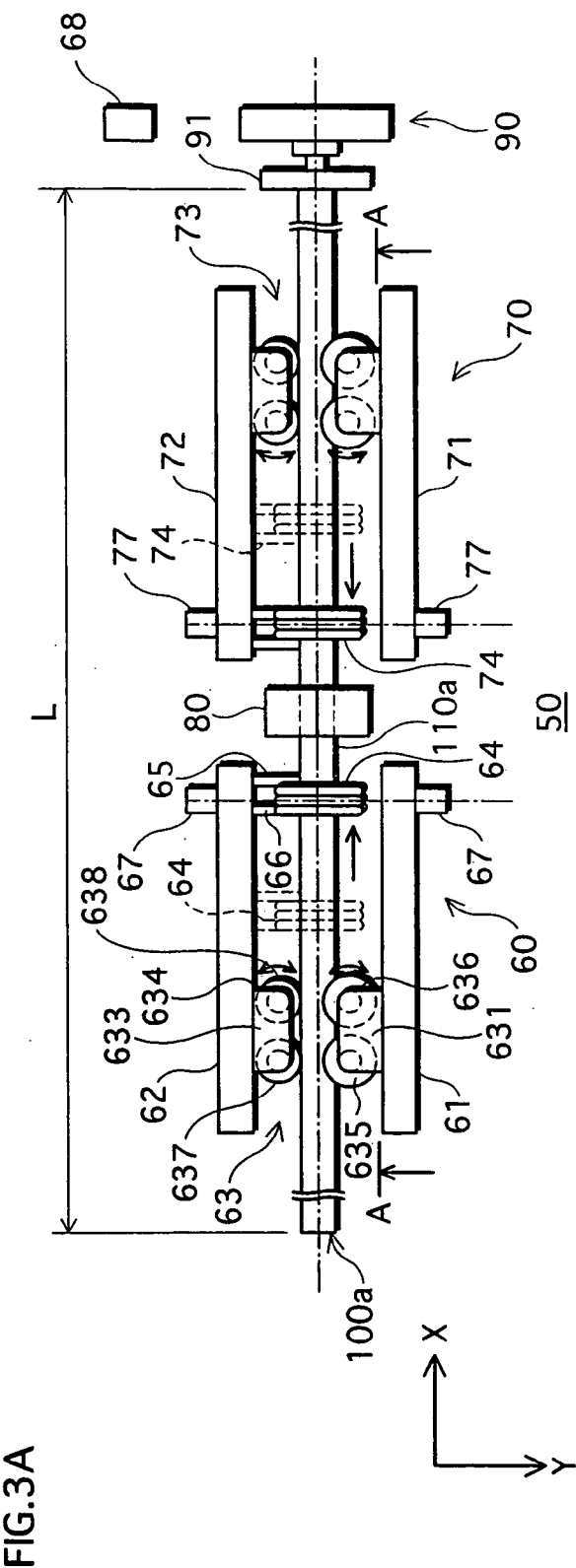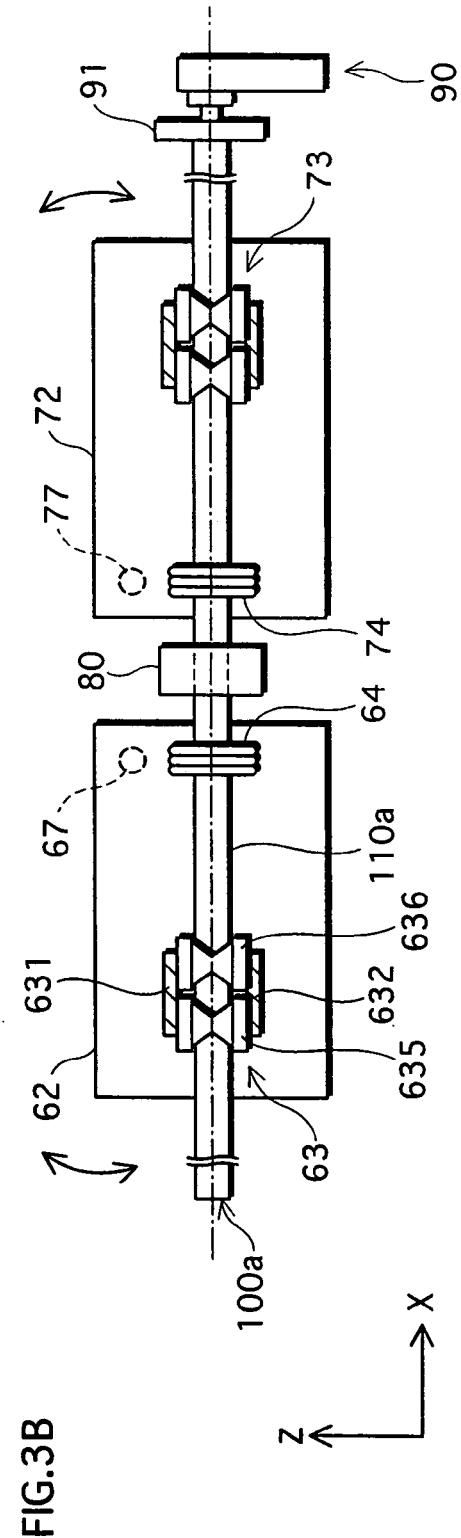

FIG.6

| SAMPLE | CURVED PORTION SHRINKAGE RATIO (%) | |
|---|---|---|
| | METHOD OF PRESENT INVENTION | CONVENTIONAL METHOD |
| 1 | 35.2 | 29.7 |
| 2 | 35.4 | 22.7 |
| 3 | 35.2 | 26.7 |
| 4 | 35.3 | 27.7 |
| 5 | 35.3 | 24.7 |
| AVERAGE | 35.3 | 26.3 |

<METHOD OF PRESENT INVENTION>

| | OUTER DIAMETER | | | | THICKNESS | | | | FLATNESS | INNER SHRINKAGE | OUTER SHRINKAGE |
|---|---|---|---|---|---|---|---|---|---|---|---|
| | A | B | C | D | E | F | G | H | D/C | H/F | G/E |
| 1 | 3.04 | 3.04 | 3.18 | 2.93 | 0.50 | 0.49 | 0.47 | 0.72 | 92.1% | 146.2% | 94.2% |
| 2 | 2.97 | 2.97 | 3.13 | 2.88 | 0.49 | 0.50 | 0.45 | 0.66 | 92.0% | 133.1% | 91.7% |
| 3 | 3.04 | 3.04 | 3.09 | 2.83 | 0.49 | 0.50 | 0.44 | 0.67 | 91.6% | 135.3% | 89.0% |
| 4 | 2.98 | 2.98 | 3.12 | 2.87 | 0.49 | 0.50 | 0.46 | 0.67 | 92.0% | 134.5% | 95.3% |
| 5 | 3.01 | 3.01 | 3.16 | 2.89 | 0.50 | 0.50 | 0.47 | 0.70 | 91.5% | 141.6% | 94.0% |
| 6 | 3.03 | 3.03 | 3.08 | 2.81 | 0.50 | 0.49 | 0.44 | 0.65 | 91.2% | 131.1% | 88.8% |
| 7 | 3.03 | 3.03 | 3.18 | 2.93 | 0.49 | 0.50 | 0.46 | 0.70 | 92.1% | 142.0% | 93.5% |
| 8 | 3.00 | 3.00 | 3.15 | 2.88 | 0.50 | 0.50 | 0.45 | 0.69 | 91.4% | 136.7% | 89.4% |
| 9 | 3.01 | 3.01 | 3.16 | 2.90 | 0.50 | 0.50 | 0.47 | 0.67 | 91.8% | 134.3% | 94.8% |
| 10 | 2.97 | 2.97 | 3.10 | 2.87 | 0.50 | 0.49 | 0.46 | 0.66 | 92.6% | 135.8% | 91.8% |
| MIN | 2.97 | 2.97 | 3.08 | 2.81 | 0.49 | 0.49 | 0.44 | 0.65 | 91.2% | 131.1% | 88.8% |
| MAX | 3.04 | 3.04 | 3.18 | 2.93 | 0.50 | 0.50 | 0.47 | 0.72 | 92.6% | 146.2% | 95.3% |
| AVE | 3.01 | 3.01 | 3.14 | 2.88 | 0.50 | 0.50 | 0.46 | 0.68 | 91.8% | 137.1% | 92.3% |

FIG.8

<CONVENTIONAL METHOD>

| | OUTER DIAMETER | | | | THICKNESS | | | | FLATNESS | INNER SHRINKAGE | OUTER SHRINKAGE |
|---|---|---|---|---|---|---|---|---|---|---|---|
| | A | B | C | D | E | F | G | H | D/C | H/F | G/E |
| 1 | 3.01 | 3.01 | 3.20 | 2.98 | 0.50 | 0.49 | 0.46 | 0.64 | 93.1% | 129.6% | 93.0% |
| 2 | 3.02 | 3.02 | 3.17 | 2.94 | 0.50 | 0.50 | 0.45 | 0.62 | 92.7% | 124.6% | 89.4% |
| 3 | 3.02 | 3.02 | 3.20 | 2.98 | 0.50 | 0.49 | 0.46 | 0.67 | 93.1% | 135.9% | 92.9% |
| 4 | 2.99 | 2.99 | 3.15 | 2.93 | 0.49 | 0.50 | 0.43 | 0.63 | 93.0% | 125.7% | 87.7% |
| 5 | 3.00 | 3.00 | 3.14 | 2.93 | 0.49 | 0.49 | 0.44 | 0.62 | 93.3% | 125.8% | 89.2% |
| 6 | 3.05 | 3.05 | 3.24 | 3.02 | 0.50 | 0.50 | 0.45 | 0.64 | 93.2% | 127.5% | 90.1% |
| 7 | 2.95 | 2.95 | 3.11 | 2.90 | 0.49 | 0.50 | 0.44 | 0.62 | 93.2% | 124.5% | 88.4% |
| 8 | 2.98 | 2.98 | 3.16 | 2.94 | 0.50 | 0.50 | 0.45 | 0.62 | 93.0% | 124.1% | 89.7% |
| 9 | 3.00 | 3.00 | 3.20 | 2.99 | 0.50 | 0.50 | 0.45 | 0.62 | 93.4% | 125.1% | 90.6% |
| 10 | 2.95 | 2.95 | 3.13 | 2.92 | 0.49 | 0.49 | 0.43 | 0.61 | 93.3% | 121.5% | 89.1% |
| MIN | 2.95 | 2.95 | 3.11 | 2.90 | 0.49 | 0.49 | 0.43 | 0.61 | 92.7% | 121.5% | 87.7% |
| MAX | 3.05 | 3.05 | 3.24 | 3.02 | 0.50 | 0.50 | 0.46 | 0.67 | 93.4% | 135.9% | 93.0% |
| AVE | 3.00 | 3.00 | 3.17 | 2.95 | 0.50 | 0.50 | 0.45 | 0.63 | 93.1% | 126.4% | 90.0% |

FIG.9

<CONVENTIONAL METHOD> (BURNER HEATING)

| | OUTER DIAMETER | | | | THICKNESS | | | | FLATNESS | INNER SHRINKAGE | OUTER SHRINKAGE |
|---|---|---|---|---|---|---|---|---|---|---|---|
| | A | B | C | D | E | F | G | H | D/C | H/F | G/E |
| 1 | 2.97 | 2.97 | 3.15 | 2.57 | 0.49 | 0.49 | 0.43 | 0.60 | 81.6% | 122.1% | 88.5% |
| 2 | 3.00 | 3.01 | 3.25 | 2.68 | 0.50 | 0.50 | 0.44 | 0.64 | 82.5% | 128.6% | 89.3% |
| MIN | 2.97 | 2.97 | 3.15 | 2.57 | 0.49 | 0.49 | 0.43 | 0.60 | 81.6% | 122.1% | 88.5% |
| MAX | 3.00 | 3.01 | 3.25 | 2.68 | 0.50 | 0.50 | 0.44 | 0.64 | 82.5% | 128.6% | 89.3% |
| AVE | 2.99 | 2.99 | 3.20 | 2.63 | 0.49 | 0.49 | 0.44 | 0.62 | 82.0% | 125.4% | 88.9% |

CURVED LAMP MANUFACTURING METHOD, CURVED LAMP, AND BACKLIGHT UNIT

This application is based on applications No. 2004-083635, No. 2004-096767 and No. 2004-100958 filed in Japan, the contents of which are hereby incorporated by reference.

BACKGROUND OF THE INVENTION (1) Field of the Invention

The present invention relates to a curved lamp manufacturing method for manufacturing a curved lamp by curving a straight glass tube, a curved lamp, and a backlight unit.

(2) Description of the Related Art

Cold-cathode fluorescent lamps (hereinafter referred to as fluorescent lamps) used in backlight units for liquid crystal display screens are one example of conventional curved lamps. The fluorescent lamps are in the shape of character "U" or "L". When they are used in a direct-below-type backlight unit, a plurality of fluorescent lamps in the shape of character "U" are arranged at the back of the screen. When they are used in an edge-light-type backlight unit, the fluorescent lamps in the shape of character "L" are attached to the rim of a rectangular optical waveguide.

In the fluorescent lamps, it is required that the bending radius (curvature radius) of the curved portion is as small as possible (as close to the right angle as possible). The following is the reason for it. In the case of the direct-below type backlight unit, the larger the curvature radius of the curved portion is, the less the number of fluorescent lamps to be arranged is. If a small number of fluorescent lamps are used, only low brightness is provided by the backlight unit. In the case of the edge-light type, the larger the curvature radius at the curved portion is, the greater the distance between the fluorescent lamps and the optical waveguide is. If there is a great distance between the fluorescent lamps and the optical waveguide, only a small amount of light enters the optical waveguide, the light distribution characteristics is deteriorated, and the backlight unit becomes large in size.

In the direct-below type, to average the light distributed to the screen, for example, the curved portion in the shape of character "U" is arranged at a position outside the screen display area. The larger the curvature radius of the curved portion is, the greater the length of the curved portion is. As a result, if the curvature radius of the curved portion is increased, the curved portion outside the screen display area is extended as much, and a large amount of light, among the light emitted from the lamp, is wasted (not illuminating the screen). Also, this makes the outer frame of the screen larger in width, making the monitor apparatus itself larger in size.

In manufacturing such a fluorescent lamp, first a straight lamp (hereinafter referred to as a straight-tube lamp) is manufactured by applying a fluorescent substance onto the inner surface of a straight glass tube, attaching electrodes to both ends of the straight glass tube, and filling the glass tube with mercury, a rare gas or the like. The manufactured straight-tube lamp is then curved into the shape of character "U" or "L". It should be noted here that the pressure inside the glass tube is kept to be lower than the atmospheric pressure.

The curving of the straight-tube lamp into the shape of character "U" or "L" is performed after the planned curved portion of the straight-tube lamp is heated and softened. As one example of the method for heating and softening the straight-tube lamp, Japanese Laid-Open Patent Application No. 6-243782 discloses use of a coil that is formed by winding a heating lead wire made of a nichrome wire or a Kanthal wire (hereinafter, the coil of the heating lead wire is referred to as a coil heater).

More specifically, while being held to extend in a horizontal direction, the straight-tube lamp is passed through the coil heater. One end of the straight-tube lamp is then fixed by a fixed chuck and the other end is held by a roller guide chuck in a manner that the roller guide chuck can move in the longitudinal direction of the straight-tube lamp. When the straight-tube lamp is in the above-mentioned state, the coil heater is electrified to heat and soften the planned curved portion, while rotating the fixed chuck along a horizontal plane around a predetermined axis.

Meanwhile, in recent years, as display panels of the liquid crystal display apparatuses have become thinner, glass tubes used in such displays have become narrower. Accordingly, glass tubes as narrow as 1-8 mm in the outer diameter have been used.

However, the above-described conventional method has a problem in manufacturing such narrow lamps. That is to say, the conventional method cannot be used to curve such narrow glass tubes, or such narrow lamps are manufactured at extremely low manufacturing efficiency. This is because the curving process makes the outer side of the curved portion thinner and weaker. As a result, when such a narrow glass tube is partially curved, the curved portion becomes weak, and by the negative pressure inside the glass tube and the atmospheric pressure, the weak portion is collapsed. In the conventional method, to prevent such collapses, a predetermined level of the curvature radius is required. This prevents the backlight unit from being made compact, and also prevents the improvement in the brightness and light distribution.

SUMMARY OF THE INVENTION

The object of the present invention is therefore to provide a curved lamp manufacturing method for manufacturing a curved lamp by locally heating a glass tube, the method being efficient even if the glass tube to be curved is narrow in diameter and has been sealed with inside thereof being under reduced pressure; a curved lamp that contributes to downsizing of the backlight unit, enables the light emitted therefrom to be used effectively, and has improved brightness and light distribution; and a backlight unit using the curved lamp.

The above object is fulfilled by a curved lamp manufacturing method including a curving process in which a straight glass tube, which was sealed with inside thereof being under reduced pressure, is heated and curved, the curving process comprising: a first step of holding a predetermined portion of the straight glass tube using a first chuck, and holding one end portion of the straight glass tube using a second chuck in a manner that the second chuck can slide in a longitudinal direction of the straight glass tube; and a second step of, while heating by a heater a planned curved portion of the straight glass tube, which is positioned between the predetermined portion and the end portion, curving the planned curved portion by moving the second chuck relative to the straight glass tube, wherein the end portion is moved in the second step so that a weight of the end portion is applied to the planned curved portion that has been softened by heat of the heater. It should be noted here that the above-stated "curved lamp" may be a cold-cathode fluorescent lamp, hot-cathode fluorescent lamp, a low-pressure discharge lamp of a dielectrics barrier discharge type or the like, and each of these discharge lamps is divided into (a) a type in which a fluorescent substance has been applied to the lamp and (b) a type in which no fluorescent substance has been applied to the lamp.

The above-stated construction provides an advantageous effect that the method is efficient even if the glass tube to be curved by local heating is narrow in diameter and has been sealed with inside thereof being under reduced pressure. This is because with above-stated construction, the planned curved portion is curved while it is softened by heat and compressed by the weight of the moved portion of the glass tube. This enables the amount of extension of the curved portions to be suppressed, and makes the outer sides of the curved portions thicker than the conventional method in which the glass tube is curved along a horizontal plane. The glass tube curved by this method has higher strength than the glass tube curved by the conventional method. This enables even a glass tube, which has a small diameter and was sealed with its inside being under reduced pressure, to be partially curved by heat. This method therefore provides an advantageous effect of manufacturing the curved lamps with high efficiency.

The above object is also fulfilled by a curved lamp having at least one curved portion, the curved lamp being generated by heating and curving a straight glass tube that was sealed with inside thereof being under reduced pressure, wherein outer diameter of the straight glass tube ranges from 1.8 mm to 6.5 mm inclusive, thickness of the straight glass tube ranges from 0.2 mm to 0.6 mm inclusive, and curvature radius of an inner side of the curved portion is equal to or larger than 0.5 mm and smaller than 4.0 mm.

With the above-stated construction in which the curvature radius of an inner side of the curved portion is equal to or larger than 0.5 mm and smaller than 4.0 mm, it is possible to downsize the backlight unit without decreasing the strength of the outer sides of the curved portions, and to use the light emitted from the lamp effectively. Also, with the outer diameter of the straight glass tube being set to 1.8 mm or more in the above-stated construction, the electrodes, which, for example, to be attached to the glass tube at the ends thereof, can be manufactured more easily. This is another advantageous effect provided by the present invention. Also, with the outer diameter of the straight glass tube being set to 6.5 mm or less in the above-stated construction, it is possible to decrease the backlight unit in thickness, namely, in length perpendicular to screen, enabling the backlight unit to be made thinner. The distance between the inner surface of the glass tube and the discharge path is shortened by this. As a result, for example, in the case where a fluorescent substance is applied to the inner surface of the glass tube, the light emitted from the fluorescent substance is increased in brightness and the light-emitting efficiency is improved. Also, with the thickness of the straight glass tube being set to a range from 0.2 mm to 0.6 mm inclusive, it is possible to prevent the curved portion from being deformed during the curving process, reduce the time required for the curving process, and reduce the manufacturing cost.

The above object is also fulfilled by a backlight unit having the curved lamp defined above, that is to say, the curved lamp having at least one curved portion, the curved lamp being generated by heating and curving a straight glass tube that was sealed with inside thereof being under reduced pressure, wherein outer diameter of the straight glass tube ranges from 1.8 mm to 6.5 mm inclusive, thickness of the straight glass tube ranges from 0.2 mm to 0.6 mm inclusive, and curvature radius of an inner side of the curved portion is equal to or larger than 0.5 mm and smaller than 4.0 mm.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIGS. 3A and 3B show the construction of a curving apparatus used for manufacturing the curved lamp in the curving process;

FIG. 6 shows the shrinkage ratio calculated from the measurement results of an experiment conducted to observe the shrinkage after curving the glass tube using the conventional method and the method of the present embodiment;

FIG. 8 shows the shrinkage ratio calculated from the measurement results of an experiment conducted to observe the shrinkage after curving the glass tube using the conventional method;

FIG. 9 shows the shrinkage ratio calculated from the measurement results of an experiment conducted to observe the shrinkage after curving the glass tube by the conventional method using a gas burner for heating;

DESCRIPTION OF THE PREFERRED EMBODIMENT

The following describes a cold-cathode fluorescent lamp, a curved lamp in the shape of character "U", to which the present invention has been applied, with reference to the attached drawings.

1. Outline of Backlight Unit

Figure 1:
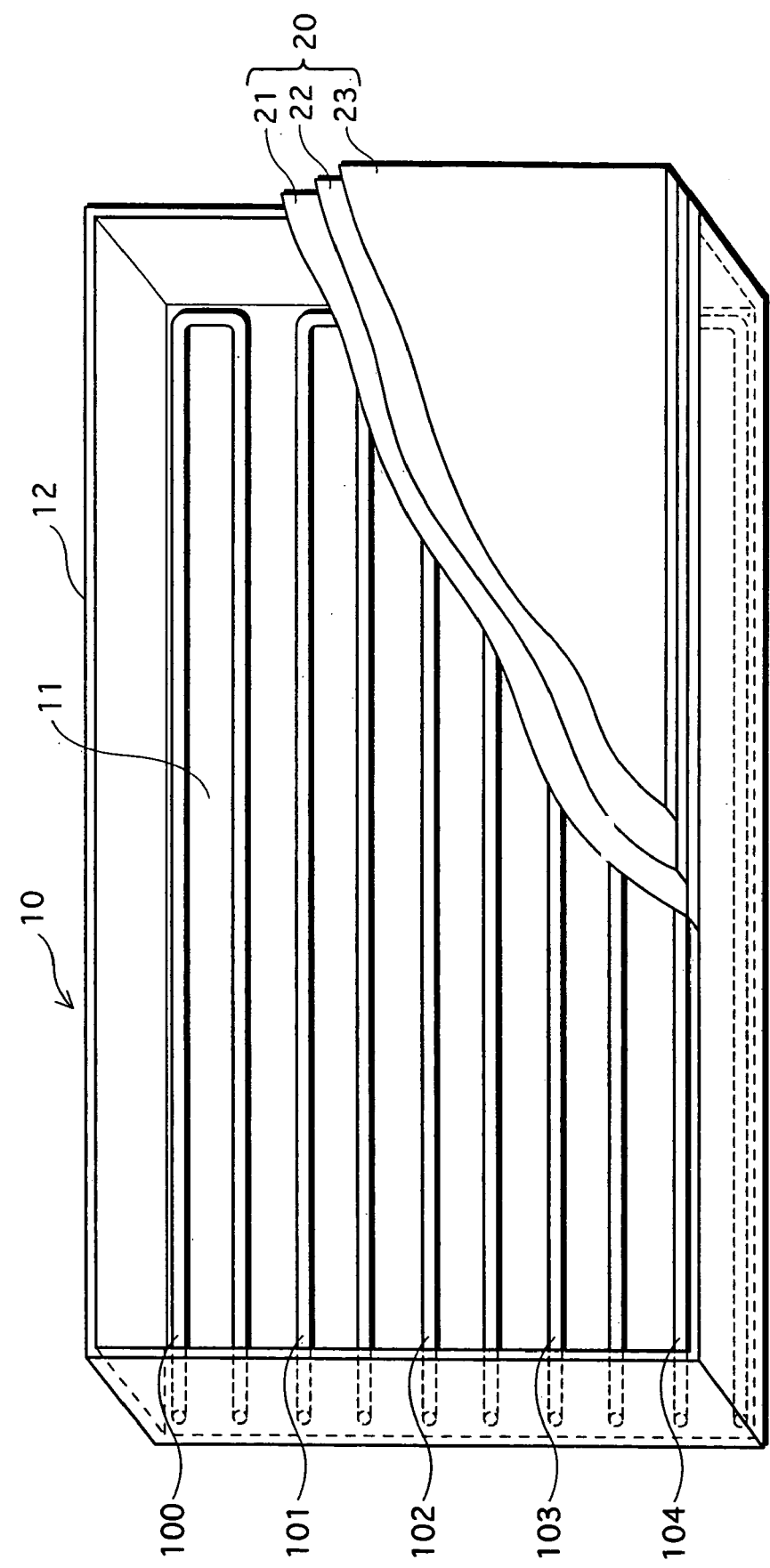
FIG. 1 is a perspective view of a backlight unit 1.

FIG. 1 is a perspective view of a direct-below-type backlight unit, of which a part of the front surface is partially cut away to show the construction inside. Here, the "front" surface of the backlight unit is closer to the screen than the opposite surface after the backlight unit is attached to the display.

As shown in FIG. 1, a backlight unit 1 includes: curved lamps 100, 101, 102, 103, and 104 in the shape of character "U" arranged in rows at regular intervals in a predetermined direction (in the example shown in FIG. 1, the direction is the vertical direction); a rectangular housing 10 for housing the curved lamps; and a front panel 20 covering the front side (opening) of the rectangular housing 10.

A bottom plate 11 of the rectangular housing 10 is a reflection plate that reflects the light emitted backward from the curved lamps 100-104 toward the front side. The bottom plate 11 is made of, for example, polyethylene terephthalate (PET). Side plates 12 of the rectangular housing 10 are made of the same resin as the bottom plate 11.

The front panel 20 is used to extract parallel light beams (in parallel with the normal direction of the front panel 20) by diffusing the light from the curved lamps 100-104. The front panel 20 includes, for example, a diffusion plate 21, a diffusion sheet 22, and a lens sheet 23. It should be noted here that the diffusion plate 21 contains acrylic.

2. Construction of Curved Lamp

Figure 2:
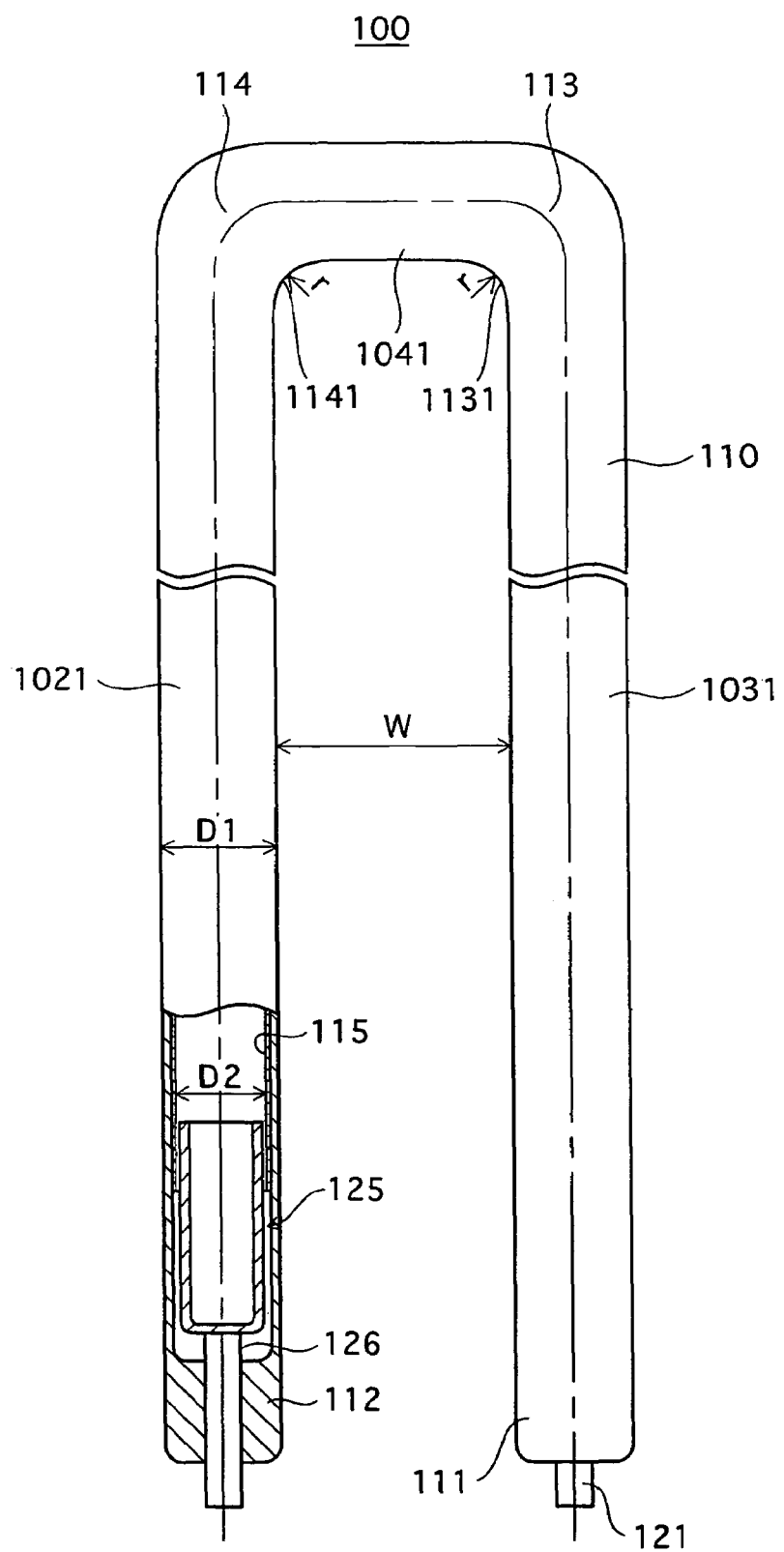
FIG. 2 shows a curved lamp.

FIG. 2 shows a curved lamp, of which one end is cut away to show the electrode construction inside.

As shown in FIG. 2, a curved lamp 100 includes: a glass tube 110; and electrodes 125 that are respectively attached to ends 111 and 112 of the glass tube 110. The curved lamp 100 is in the shape of character "U" whose curved portions are identified as 113 and 114, respectively.

The electrodes 125 are each in the shape of a cylinder with a bottom. The ends 111 and 112 of the glass tube 110 are sealed with electrode bars 121 and 126 attached to the bottoms of the electrodes 125, respectively. It should be noted here that although it is not shown in FIG. 2, the electrode 125 at the end 111 of the glass tube 110 has the same construction as the electrode 125 at the end 112.

The glass tube 110 is made of, for example, borosilicate glass. A fluorescent substance (of, for example, three-wavelength type) 115 is applied to the inner surface of the glass tube 110. The glass tube 110 is filled with mercury, a rare gas or the like. The inner pressure of the glass tube 110 is negative in relation to the atmospheric pressure. The curved lamps 101-104 have basically the same construction as the above-described curved lamp 100, and the description thereof is omitted here.

3. Method of Manufacturing Curved Lamp

Next, the method of manufacturing the curved lamp 100 will be described by dividing it into the straight lamp manufacturing process, curving process, and extraction process.

(3-1) Straight Lamp Manufacturing Process

In the straight lamp manufacturing process, a straight lamp is manufactured by applying a fluorescent substance to the inner surface of the straight glass tube, attaching the electrodes to seal the glass tube and the like.

These procedures will be described more specifically. Firstly, a straight glass tube with a desired measurement is prepared, and a fluorescent substance is applied to the inner surface thereof. The application of the fluorescent substance is performed by, for example, introducing a suspension containing the fluorescent substance into the inside of the glass tube from one end thereof, then draining out the suspension, and drying the suspension that remained in the glass tube by a heating furnace using electricity, gas or the like.

Next, a pair of electrodes are respectively attached to the ends of the glass tube. This is performed by, for example, attaching one of the pair of electrodes to one end of the glass tube, temporarily attaching the other of the pair of electrodes to the other end of the glass tube, and in this state, exhausting gases from the inside of the glass tube to outside through the other end of the glass tube, filling the glass tube with mercury and a rare gas, and then sealing the other end of the glass tube completely. In this way, a straight lamp with a desired length is manufactured. This process can be performed by a conventional method. In the following description, to differentiate between the straight lamp and the curved lamp, the straight lamp is identified as 100a, and the glass tube in the straight lamp is identified as 110a. It is supposed here that the straight lamp 100a used in this example has 600 (mm) of overall length L, approximately 3 (mm) of outer diameter D1, and approximately 2 (mm) of inner diameter D2, that the curved lamp 100 manufactured in this example has 0.5 (mm) of curvature radius r at the inside of the curved portion of the glass tube, and that the distance W between the two straight tube portions of the curbed lamp is approximately 20 (mm).

It should be noted here that the curvature radius r can be indicated by the curvature radius of curves 1131 and 1141 which are respectively inner outline curves of curved portions 113 and 114, the inner outline curves being observed in a top plan view of the curved lamp 100 as in FIG. 2. It should also be noted here that when a curved portion partially includes a straight line, convex, or concave in shape, the curvature radius r is defined as the curvature radius of the entire curve that is obtained by extending a curving part that actually exists in the curve.

It should be noted here that the measurement values of the curved lamp at various portions (glass tube outer diameter, curvature radius, and so on) provided in the present document in relation to FIG. 2 are different from the actually measured values. This arrangement is made for the sake of convenience. This also applies to the other drawings.

(3-2) Curving Process

The curving process is a process in which the planned curved portions (which correspond to the curved portions 113 and 114 and are hereinafter identified as 113a and 114a, respectively) of the glass tube 110a of the straight lamp 100a are heated and curved by 90 degrees. Now, the curving process will be described in detail with reference to FIGS. 3-6.

FIGS. 3A and 3B show the construction of a curving apparatus 50 used for manufacturing the curved lamp in the curving process. FIG. 3A is a top plan view of the curving apparatus 50. FIG. 3B is a front view of the curving apparatus 50 viewed in the direction indicated by the arrows of FIG. 3A and is a cross-sectional view substantially taken along the line A-A of FIG. 3A.

As shown in FIGS. 3A and 3B, the curving apparatus 50 includes holding units 60 and 70, a fixing unit 80, and a positioning unit 90. These units are supported by a base (not illustrated). The holding unit 60 includes plate-like members 61 and 62, a driven chuck 63, and a heater 64.

The plate-like members 61 and 62 are linked with each other by a linking member (not illustrated) so that the main surfaces are substantially in parallel with a vertical plane with a predetermined distance between them. The plate-like members 61 and 62 have a rotational axis 67 that is in parallel with the Y direction. The plate-like members 61 and 62 are held in a manner that they can rotate, as one unit, around the rotational axis 67 along the vertical plane. Although the rotary drive apparatus for rotating the plate-like members 61 and 62 are not shown in the figures, it can be achieved by a known technology as, for example, an apparatus that uses a feed screw system in which the plate-like members 61 and 62 are engaged with feed screws, and the plate-like members 61 and 62 are driven by rotating the feed screws by a motor. Also, the rotary drive apparatus may be any apparatus that has the above-described function, such as the one that has a gear fixed to the rotational axis 67, and drives the gear to rotate using a mechanism for transferring a motion to the gear.

The driven chuck 63 holds the glass tube 110*a* in a manner that it can slide (move) along the tube axis of the glass tube 110*a* (a direction in parallel with the X direction), namely in the longitudinal direction of the glass tube 110*a*. The driven chuck 63 includes: plate-like holding members 631, 632, 633, and 634 (hidden under the member 633 in FIG. 3A); metal rollers 635 and 636 each having a V-shaped groove; and cylindrical metal rollers 637 and 638.

The holding members 631 and 632 hold the rollers 635 and 636 in a manner that the rollers 635 and 636 can rotate around the axes respectively in the directions indicated by the arrows in FIG. 3A. The holding members 631 and 632 are bonded with the inner surface of the plate-like member 61.

The holding members 633 and 634 hold the rollers 637 and 638 in a manner that the rollers 637 and 638 can rotate around the axes respectively in the directions indicated by the arrows in FIG. 3A. The holding members 633 and 634 are bonded with the inner surface of the plate-like member 62.

The rollers 635-638 hold the glass tube 110*a* by what is called a three-point support in which the rollers 635 and 636 respectively have contact with the outer surface of the glass tube 110*a* at two points, and the rollers 637 and 638 respectively have contact with the outer surface of the glass tube 110*a* at one point, in a manner that the driven chuck 63 can slide along the tube axis of the glass tube 110*a*, the rollers 635 and 637 making a pair in sandwiching the glass tube, and the rollers 636 and 638 making a pair in sandwiching the glass tube. It should be noted here that the driven chuck is not limited to the above-described one, but may be any member that can hold the glass tube 110*a* in a manner that that the driven chuck 63 can slide along the tube axis of the glass tube 110*a*. For example, the glass tube 110*a* may be inserted into a tube-like member with a room between them, and the tube-like member may be lifted up for curving the glass tube. The rollers may be replaced with belts. Also, the material of the members is not limited to metal, but may be resin, for example.

The heater 64 is a coil heater that has a coil of three turns, and is formed by winding one heater wire so as to have the same coil diameter (in this example, so as to have the coil diameter of 8 mm).

Leads 65 and 66 of the heater 64 are held by the plate-like member 62 via a heater holding member (not illustrated) so that the axis of the coil matches the tube axis of the glass tube 110*a*, in a manner that the heater 64 can move in the X direction between the positions indicated by the dotted line and the solid line. In the curving process, the heater 64 is moved by a moving apparatus (not illustrated) in the X direction between the positions indicated by the dotted line and the solid line. As is the case with the rotary drive apparatus, the moving apparatus may be achieved as an apparatus that uses a feed screw system in which the heater holding member is engaged with a feed screw, and the heater 64 is moved by rotating the feed screw by a motor.

The tips of the leads 65 and 66 further extend to connect to a power apparatus 68 for the lamp heating. The power apparatus 68 supplies power to the heater 64.

Figure 4A:
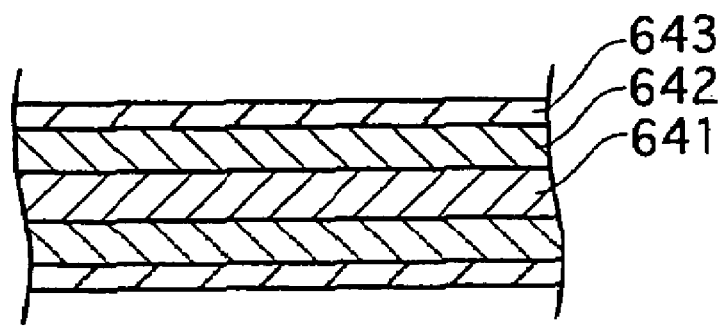
FIGS. 4A and 4B are cross-sectional views of the heater wire of the heater, FIG. 4A being a longitudinal sectional view, and FIG. 4B being a transverse sectional view.
Figure 4B:
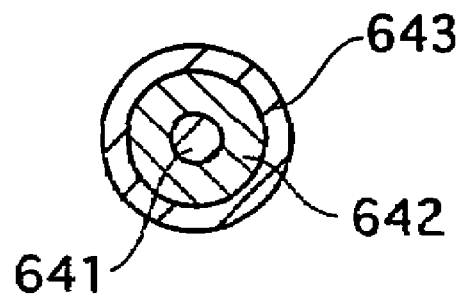

FIGS. 4A and 4B are cross-sectional views of the heater wire of the heater 64. FIG. 4A is a longitudinal sectional view. FIG. 4B is a transverse sectional view.

As shown in FIGS. 4A and 4B, the heater wire is composed of three layers. More specifically, the heater wire includes a heat wire 641 made of a Kanthal wire or a nichrome wire, which is covered with an insulator 642 made of magnesium oxide, which is covered with a metal pipe (sheath) 643 made of inconel. For this reason, the heater 64 is also referred to as a sheath heater. In this example, the heat wire 641 is approximately 0.3 (mm) in diameter, the sheath 643 is approximately 1.6 (mm) in outer diameter and approximately 1.0 (mm) in inner diameter, and the insulator 642 is approximately 0.35 (mm) in thickness.

The reason why the heater wire is constructed as described above is as follows. If a heater coil made of a nichrome wire or a Kanthal wire is kept to be red-hot to soften the glass tube, the heater coil tends to be deformed over time due to the residual stress of the coil. More specifically, if the heater coil is heated for a long time, the coil diameter may be decreased at the center turn and increased at the two end turns due to a difference in temperature between the center turn and the two end turns. When this happens, the ring-like shape of the coil may be deformed, and the pitch may become uneven, and a local heating point, at which the straight-tube lamp is heated by the coil, may be shifted. This means that the manufactured fluorescent lamps vary in terms of the position of the curved portion since the portion is curved as the coil heats the planned portion. Products having a large amount of variation are regarded as defective products. Increase of the defective products decreases the yielding ratio. In actuality, if a heater coil is heated for approximately 150 hours, the amount of variation reaches such an extent that the heater coil needs replacing with a new one. The time and effort, management, cost and the like required for the replacement are burdensome.

With use of the sheath heater, it is possible to make the turns of the coil close to each other since in the sheath heater, the heat wire 641 is isolated from the sheath 643 surrounding the heat wire 641. This makes it possible to decrease the coil in length in the direction of the coil axis (The length is also referred to as a coil width, and the coil used in this example is approximately 6 mm in coil width.) to such an extent that it can be used to locally heat the glass tube 110*a*. The sheath heater also provides an advantage effect that if the heat wire 641 suffers stress by heat over time due to the residual stress or the like when the sheath heater is kept to be at a temperature as high as possible to soften the glass tube, the sheath coil is hardly deformed since the adjacent turns of the coil, which are close to each other, suppress the strength of the deformation.

Also, since the sheath 643 itself is not a heating element, the sheath 643 may be made of a material that is higher in rigidity than the Kanthal or nichrome wire. Further, if the heat wire 641 is deformed by heat, the insulator 642 prevents the sheath 643 and the coil from being deformed by playing a role of a buffer that absorbs the strength of deformation. Actually, when a coil of the sheath heater was heated for approximately 700 hours in an experiment, hardly a deformation was observed in the coil. This proves that the sheath heater is far superior than a heater that is a coil of a bare wire of Kanthal or nichrome, which can be used only for approximately 150 hours. The use of the sheath heater therefore prevents the above-described problems: the time and effort and the like required for replacing the heater; and the variation in the position of the curved portion of the glass tube due to shifting of the heating position caused by the deformation of the coil over time.

It should be noted here that the heater is not limited to the sheath heater, but a Kanthal wire or the like may be used. Also, a gas burner may used as the heater.

Back to FIG. 3, the holding unit 70 includes plate-like members 71 and 72, a driven chuck 73, and a heater 74, which basically have the same construction as the plate-like members 61 and 62, driven chuck 63, and heater 64. These elements of the holding units 60 and 70 are arranged symmetrically on either side of the fixing unit 80. The plate-like members 71 and 72 are held in a manner that they can rotate, as one unit, around a rotational axis 77 along a vertical plane. A rotary drive apparatus (not illustrated), which has the same mechanism as the rotary drive apparatus for the holding unit 60, is disposed for rotating the holding unit 70. The heater 74 receives power from the power apparatus 68 that also supplies power to the heater 64. The power apparatus 68 supplies the same amount of power to the heaters 64 and 74.

The fixing unit 80, which includes a known metal fixed chuck, is used to fix a predetermined portion of the glass tube 110a. The fixed chuck used in this example divides into two pieces in the Y direction. The fixed chuck is opened to let the glass tube 110a pass through, and is closed to fix the glass tube 110a. The fixed chuck is not limited to the above-described one, but may have any shape and material in so far as it can hold the glass tube 110a. For example, the fixed chuck may be made of resin. The predetermined portion to be fixed may be approximately the center of the length of the glass tube 110a. However, not limited to this, the predetermined portion may be determined based on the planned positions of the curved portions 113 and 114.

The positioning unit 90 is used to position the straight lamp 100a in the direction of the tube axis when the straight lamp 100a is set in the curving apparatus 50. The positioning unit 90 includes a contact plate 91 used to determine a standard position in the direction of the tube axis.

The curving process is performed as follows.

(1) Setting Step

In the setting step, the straight lamp 100a, which has been manufactured in the straight lamp manufacturing process, is set in the curving apparatus 50. More specifically, as shown in FIGS. 3A and 3B, the driven chuck 63, heater 64, fixing unit 80, heater 74, and driven chuck 73 are arranged in series in the X direction. The glass tube 110a is then passed through, in order from the left-hand side to the right-hand side of FIGS. 3A and 3B, the space between each pair of rollers of the driven chuck 63, inside the coil of the heater 64, the fixing unit 80 (in the open state), inside the coil of the heater 74, and the space between each pair of rollers of the driven chuck 73 until one end of the glass tube 110a is brought into contact with the contact plate 91. In this state, the fixed chuck of the fixing unit 80 is closed to fix the glass tube 110a.

Currently, the glass tube 110a is substantially in the horizontal direction and is fixed at its center by the fixed chuck in a manner that the driven chuck 63 can slide along one half of the tube axis of the glass tube 110a and the driven chuck 73 can slide along the other half of the tube axis of the glass tube 110a. In this state, the heaters 64 and 74 are respectively at the positions indicated by the dotted lines in FIG. 3A.

(2) Power Supply Step

In the power supply step, the power apparatus 68 and the moving apparatus are activated, the power apparatus 68 supplies power to the heaters 64 and 74, and the heaters 64 and 74 are moved to and stopped at the positions, which are, as indicated by the solid lines in FIG. 3A, under the rotational axes 67 and 77, respectively. In this step, while the heaters 64 and 74 move from the positions indicated by the dotted lines to the positions indicated by the solid lines, the heaters 64 and 74 are supplied with power and heated. The amount of power supplied to the heaters 64 and 74 is controlled in accordance with the moving speed so that when the heaters 64 and 74 stop, they are at a predetermined temperature that is higher than the softening temperature of the glass tube. The portions of the glass tube 110a, which are each a portion between the dotted-line position and the solid-line position and are each the planned curved portion, are heated as the heaters 64 and 74 move and become easy to curve. This makes the planned curved portions easier to curve in the curving operation. Also the portions may be preparatively heated. This increases the speed at which the portions are curved.

When the heaters 64 and 74 move and stop at the positions indicated by the solid lines, the glass tube 110a starts to soften. The amount of power supplied to the heaters 64 and 74 is determined beforehand as the amount of power that causes the heaters to soften the glass tube enough to be curved. In this example, a glass tube having the softening temperature of approximately 760° C. is used, and the amount of power supplied to the heaters 64 and 74 is set to a value that causes the glass tube temperature to be in a range from 750° C. to 760° C., a range that is equal to or lower than the softening temperature.

(3) Drive Step

In the drive step, the rotary drive apparatus is activated, the holding units 60 and 70 are each rotated upward around the rotational axes 67 and 77 at a predetermined speed by a predetermined angle (in this example, 90 degrees), along the vertical plane that includes the tube axis of the glass tube 110a.

Figure 5:
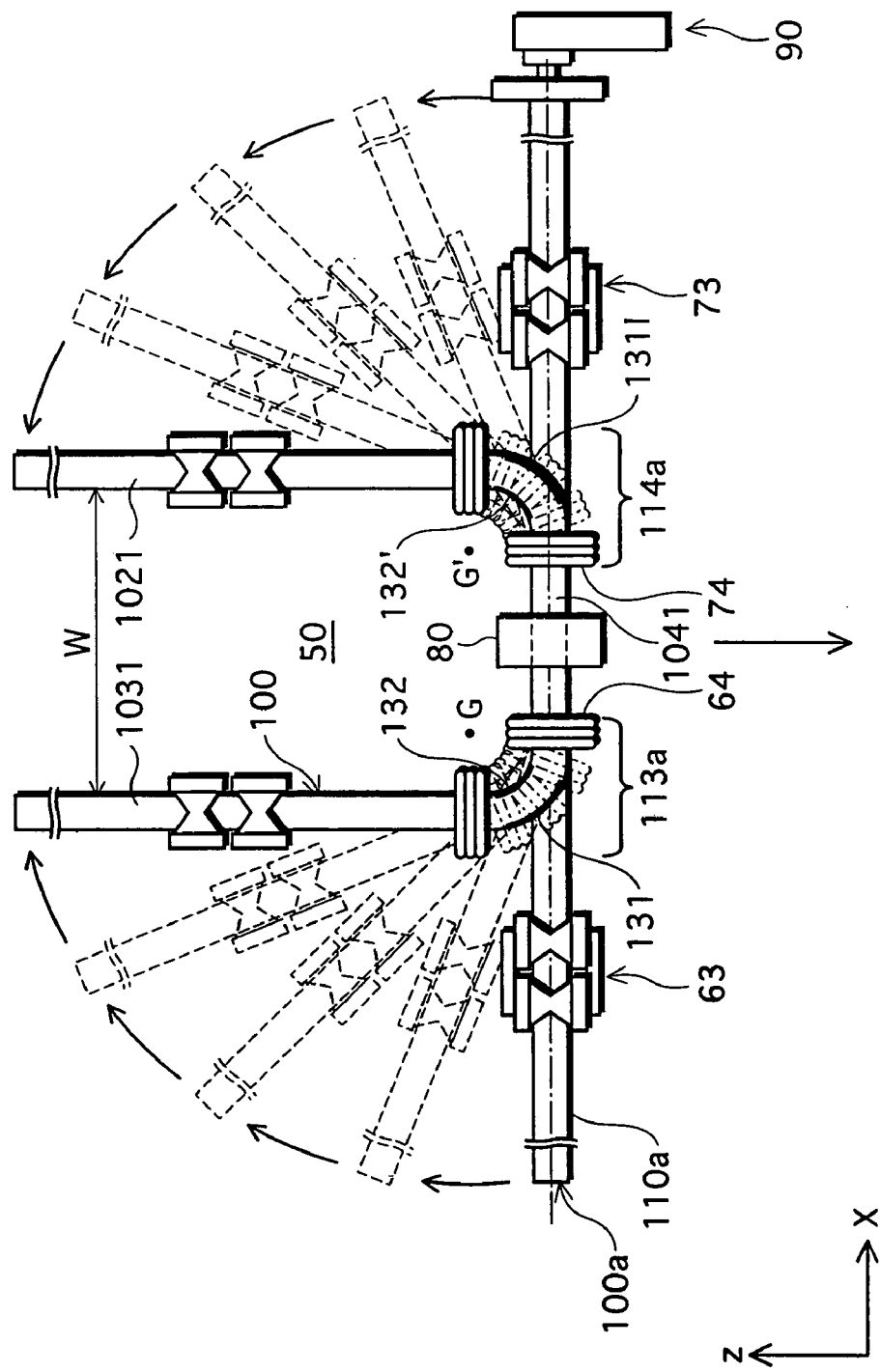
FIG. 5 is a front view showing how the driven chucks move upward as the holding units rotate.

FIG. 5 is a front view showing how the driven chucks 63 and 73 move upward as the holding units 60 and 70 rotate. In FIG. 5, the plate-like member 61 and the like are omitted to show the trails in the movement of the driven chucks and heaters. In FIG. 5, the centers of the rotational axes 67 and 77 are indicated by G and G'.

As shown in FIG. 5, the driven chucks 63 and 73 rotate around G and G' drawing arcs. In other words, the driven chucks 63 and 73 rotate so that the trajectories of the driven chucks 63 and 73 produce a plane symmetry on either side of a plane that is perpendicular to the tube axis of the glass tube 110a at the position fixed by the fixing unit 80. With this operation, the two end portions of the glass tube 110a except for the central portion fixed by the fixing unit 80 are respectively curved by 90 degrees, and the glass tube 110a is shaped into the character "U". In this sense, G and G', which represent the centers of the rotational axes 67 and 77, also represent the centers of the curvatures of the curved portions 113 and 114, respectively.

In the above operation, the heaters 64 and 74 also move by rotating around G and G' at the same time as the driven chucks 63 and 73 move in a similar manner. This means that heating points of planned curved portions 113a and 114a move upward as the two end portions of the glass tube 110a are curved. This prevents the glass tube from breaking in the middle of the curving, and enables each end portion of the glass tube 110a to be curved with a predetermined curvature radius.

Also, as stated earlier, the driven chucks 63 and 73 hold the glass tube 110a in a manner that they can slide along the tube axis of the glass tube 11a. This means that they move relatively to the glass tube 110a during the curving. Accordingly, a tube-axis-direction component of the weight received by the lifted portions of the glass tube 110a is applied to the portions softened by the heat of the heaters. In other words, when the glass tube 110a is curved, the weight of the two end portions of the glass tube 110a is applied to the softened portions, and the softened portions are compressed by the weight.

In case the glass tube is curved by a conventional method, in which the glass tube is curved along a horizontal plane, outer sides 131 and 131' of the curved portions of the glass tube become very thin because the driven chucks pull the softened portions with tension without no forth for compression, and the softened portions extend in the direction of length. In contrast, according to the method of the present embodiment, the softened portions are compressed by a forth, which reduces the amount of extension of the curved portions per unit volume and makes the outer sides 131 and 131' thicker than the conventional method.

FIG. 6 shows the shrinkage ratio calculated from the measurement results of an experiment conducted to observe the shrinkage after curving the glass tube using the conventional method and the method of the present embodiment.

More specifically, in this experiment, the straight-tube lamp was marked at regular intervals of 1 mm, the straight-tube lamp was curved by the different methods, and the marking interval P (mm) of the inner side of the curved portions were measured. The shrinkage ratio was then calculated from the measurement results. The shrinkage ratio here is represented by (1-P)×100(%). The greater the shrinkage ratio is, the narrower the marking interval P is, and the thicker the inner side of the curved portion is.

As shown in FIG. 6, the average values of five samples for each of the conventional method and the method of the present embodiment indicate that the present embodiment has greater shrinkage ratio than the conventional method. Accordingly, the inner sides (represented by 132 and 132' in FIG. 5) of the curved portions are thicker in the glass tube curved by the method of the present embodiment than in the glass tube curved by the conventional method.

This also applies to the outer sides of the curved portions. That is to say, a ratio of marking interval between the inner and outer sides of the curved portions is substantially equal to a ratio of curvature radius between the inner and outer sides of the curved portions. Accordingly, if the marking interval of the inner sides of the curved portions is narrower than those of the conventional method, the marking interval of the outer sides of the curved portions is also narrower than those of the conventional method. This means that the outer sides of the curved portions curved by the method of the present embodiment are smaller in the amount of extension, greater in the shrinkage ratio, and thicker than the outer sides of the curved portions curved by the conventional method. It is understood from this that the present embodiment makes the curved portions thicker than the conventional method. It was also confirmed by the experiment that the circular shape of cross section of the glass tube was substantially maintained in the curved portions after they were curved.

As described above, the present embodiment makes the curved portions thicker than the conventional method. Also, in relation to this, the present embodiment makes the curvature radius r smaller than the conventional method. If the curvature radius r is excessively small, the outer sides of the curved portions become weak. Conversely, if the curvature radius r is large, the backlight unit becomes large in size, and a large amount of light, among the light emitted from the lamp, is wasted. Also, if a glass tube 110a with a small outer diameter is intended for use, the inner diameter thereof, which becomes small as much, should also be taken into account since the electrodes to be inserted into the glass tube need to be small as much. It is difficult to manufacture extremely small electrodes. Also, if the inner diameter is small, the distance between the inner surface of the glass tube 110a and the discharge path becomes short, which makes the discharge space narrow, reduces the brightness of the light emitted from the fluorescent substance, and decreases the light-emitting efficiency. Conversely, if the outer diameter is large, the backlight unit becomes thick, going against the demand for thin backlight units, and since the inner diameter becomes large, the distance between the inner surface of the glass tube 110a and the discharge path becomes large, which, as is the case with the short distance, reduces the brightness of the light emitted from the fluorescent substance, and decreases the light-emitting efficiency. If the glass tube 110a is excessively thin, the planned curved portions apt to be deformed and squashed when they are heated and curved, and if the glass tube 110a is excessively thick, the amount of heat increases and a more amount of time is taken for the curving, which increase the manufacturing cost.

Taking the above-described problems into consideration, the inventors of the present invention confirmed through experiments that glass tubes with the outer diameter ranging from 1.8 mm to 6.5 mm inclusive, and thickness ranging from 0.2 mm to 0.6 mm inclusive are suitable for manufacturing the curved lamps by the curving method of the present invention, and the suitable curvature radius r is equal to or larger than 0.5 mm and smaller than 4.0 mm, for achieving the improved strength of the curved portions, downsizing of the backlight unit, effective use of light emitted from the lamp, improvement of the light-emitting efficiency, simplified manufacturing of the electrodes, and reduced manufacturing cost for the curving process.

Figure 7:
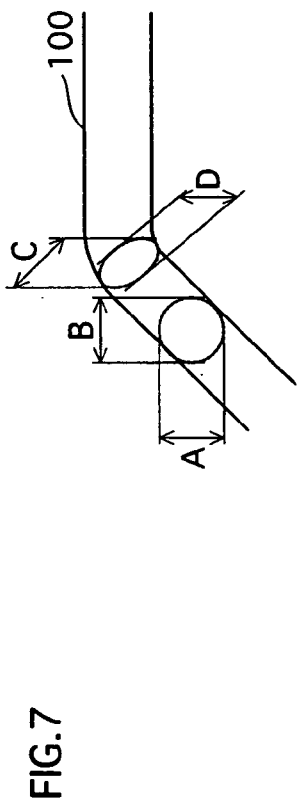
FIG. 7 shows the shrinkage ratio calculated from the measurement results of an experiment conducted to observe the shrinkage after curving the glass tube using the method of the present embodiment.

FIGS. 7-9 show the shrinkage ratio calculated from the measurement results of an experiment using the glass tube with the outer diameter 3.0 mm and the thickness of 0.5 mm, with the curvature radius r being 3.9 mm, as one example meeting the suitable ranges. FIG. 7 shows the obtained values with the method of the present invention. FIG. 8 shows the obtained values with the conventional method. FIG. 9 shows the obtained values with the conventional method using a gas burner for heating.

In FIGS. 7-9, the values "A" and "B" indicate the outer diameters measured at a straight tube portion of the curved lamp in two different directions perpendicular to the tube axis.

The values "C" and "D" indicate the largest and smallest outer diameters of the glass tube obtained by cutting it at the center of the length of the curved portion in a direction perpendicular to the tube axis.

The value "G" indicates the glass tube thickness (minimum) at the outer side of the curved portion (corresponding to 131 and 131' of FIG. 5). The value "H" indicates the glass tube thickness (minimum) at the inner side of the curved portion (corresponding to 132 and 132' of FIG. 5).

The value "E" indicates the glass tube thickness at the outer side of the planned curved portion before it is curved. The value "F" indicates the glass tube thickness at the inner side of the planned curved portion before it is curved.

From the average values of the inner and outer shrinkage (H/F and G/E), which are provided in the "AVE" row in each of FIGS. 7-9, it is understood that the curved lamp manufactured by the method of the present invention has larger values of the inner and outer shrinkage than the curved lamp manufactured by the conventional method. That is to say, the curved lamp manufactured by the method of the present invention is thicker at the curved portions than the curved lamp manufactured by the conventional method. The curved lamp manufactured by the method of the present invention, whose data is shown in FIG. 7, is thicker and as much stronger than the curved lamp manufactured by the conventional method of FIGS. 8 and 9. The method of the present invention therefore has high manufacturing efficiency. As shown in FIG. 8, the samples of the conventional method include many lamps that may be deformed or broken easily due to insufficient strength. Accordingly, the conventional method has low manufacturing efficiency. Also, in terms the flatness (D/C), there is hardly a difference between data of FIGS. 7 and 8. However, it is understood by comparing the values of flatness (D/C) of FIGS. 7 and 8 with those of FIG. 9 that heating a glass tube by a gas burner deteriorates the glass tube in flatness.

It is preferable to use glass tubes with the outer diameter ranging from 2.4 mm to 5.0 mm inclusive, and thickness ranging from 0.3 mm to 0.5 mm inclusive, for achieving the improved strength of the curved portions, improvement of the light-emitting efficiency and the like.

Back to FIG. 5 in regards with the operation in the drive step, after the holding units 60 and 70 are each rotated by 90 degrees, the rotation is stopped and supply of power to the heaters 64 and 74 is stopped.

In this way, the planned curved portions 113a and 114a of the glass tube 110a on the sides of the fixing unit 80 are curved by rotating around the rotational axes 67 and 77 by 90 degrees with a predetermined bending radius, and the curved lamp 100 is manufactured. It should be noted here that in this example, a stepping motor is used as the motor of the rotary drive apparatus, and that the number of rotations (the number of steps) required for curving the glass tube 110a by 90 degrees is determined beforehand based on the experiment results or the like, and the operation of the rotary drive apparatus is set to stop when the motor has rotated as many times as the predetermined number of steps.

As described above, according to the manufacturing method of the present embodiment, the glass tube 110a of the straight lamp 100a being in the horizontal direction is fixed at its substantial center by the fixed chuck (the first chuck), one end portion of the glass tube on one side of the first chuck is held by the driven chuck 63 (the second chuck) in a manner that the driven chuck 63 can slide along the tube axis (length) of the glass tube 110a, the other end portion of the glass tube on the other side of the first chuck is held by the driven chuck 73 (the third chuck) in a manner that the driven chuck 73 can slide along the tube axis, the driven chucks 63 and 73 are moved upward relative to the glass tube along the vertical plane including the tube axis, and the planned curved portions 113a and 114a are curved while they are softened by heat and compressed by the weight of the two end portions of the glass tube 110a positioned above. This enables the amount of extension of the curved portions to be suppressed, and makes the outer sides of the curved portions thicker than the conventional method in which the glass tube is curved along a horizontal plane. The glass tube curved by the method of the present embodiment has higher strength than the glass tube curved by the conventional method. This enables even a glass tube, which has a small diameter and was sealed with its inside being under reduced pressure, to be partially curved by heat. The method of the present embodiment therefore provides an advantageous effect of manufacturing the curved lamps with high efficiency.

Also, by adopting a rotation mechanism that enables the driven chucks 63 and 73 to simultaneously rotate around predetermined positions, the method of the present embodiment can, in the curving process, speedily curve the glass tube 110a into the character of "U" with a predetermined curvature radius and by a predetermined angle and without varying.

Furthermore, the curving apparatus 50 provides the following advantageous effect. As shown in FIG. 3, the driven chucks 63 and 73 of the curving apparatus 50 have rollers that make pairs (a pair of 635 and 637, a pair of 636 and 638 and the like) sandwiching the glass tube 110a, and they move upward (in the Z direction) as they are in this state. Accordingly, as shown in FIG. 5, even after two straight tube portions 1021 and 1031 stand erect by the curving, the rollers in each pair are arranged along the Y direction (a direction perpendicular to a plane of FIG. 5, namely, a direction being substantially in parallel with a plane perpendicular to the tube axis of a portion of the glass tube 110a held by the fixed chuck, the direction) sandwiching the glass tube 110a and facing each other. This arrangement prevents a conventional problem that if, for example, the rollers in each pair are arranged along the Z direction sandwiching the glass tube 110a and facing each other (that is to say, in the state after the driven chucks 63 and 73 are rotated around the tube axis by 90 degrees in FIG. 5), one of the rollers may be inserted between the two straight tube portions 1021 and 1031 after the curving, and distance W between the two straight tube portions 1021 and 1031 cannot be reduced due to the presence of the roller. In contrast, according to the method of the present embodiment, it is possible to manufacture a curved lamp in the shape of character "U" with reduced distance W, which is also an advantageous effect of the present invention.

In the present embodiment, a sheath heater is used to heat the glass tube 110a. This provides advantageous effects that the variation of the position of the curved portion generated over time is reduced compared with the case where the Kanthal or nichrome wire is used, and that the cost for the replacement of the heaters to prevent the variation is suppressed. Also, since the turns of the coil using the sheath wire can be made to be in close contact with each other, it is possible to shorten the coil width, which makes it possible to heat a local portion of the glass tube 110a with a reduced length, at the same time achieving a reduced bending radius. Furthermore, the shortened coil width makes it possible to reduce the length of a linkage portion 1041 located at the center of the lamp curved into the character U, fixed by the fixed chuck, and sandwiched by the two heaters (see FIG. 5). This indicates that a distance W between the two straight tube portions of the curved lamp can be reduced, which makes it possible, for example in the case of a direct-below-type backlight unit, to increase the number of lamps arranged per unit area.

(3-3) Removing Process

Figure 10:
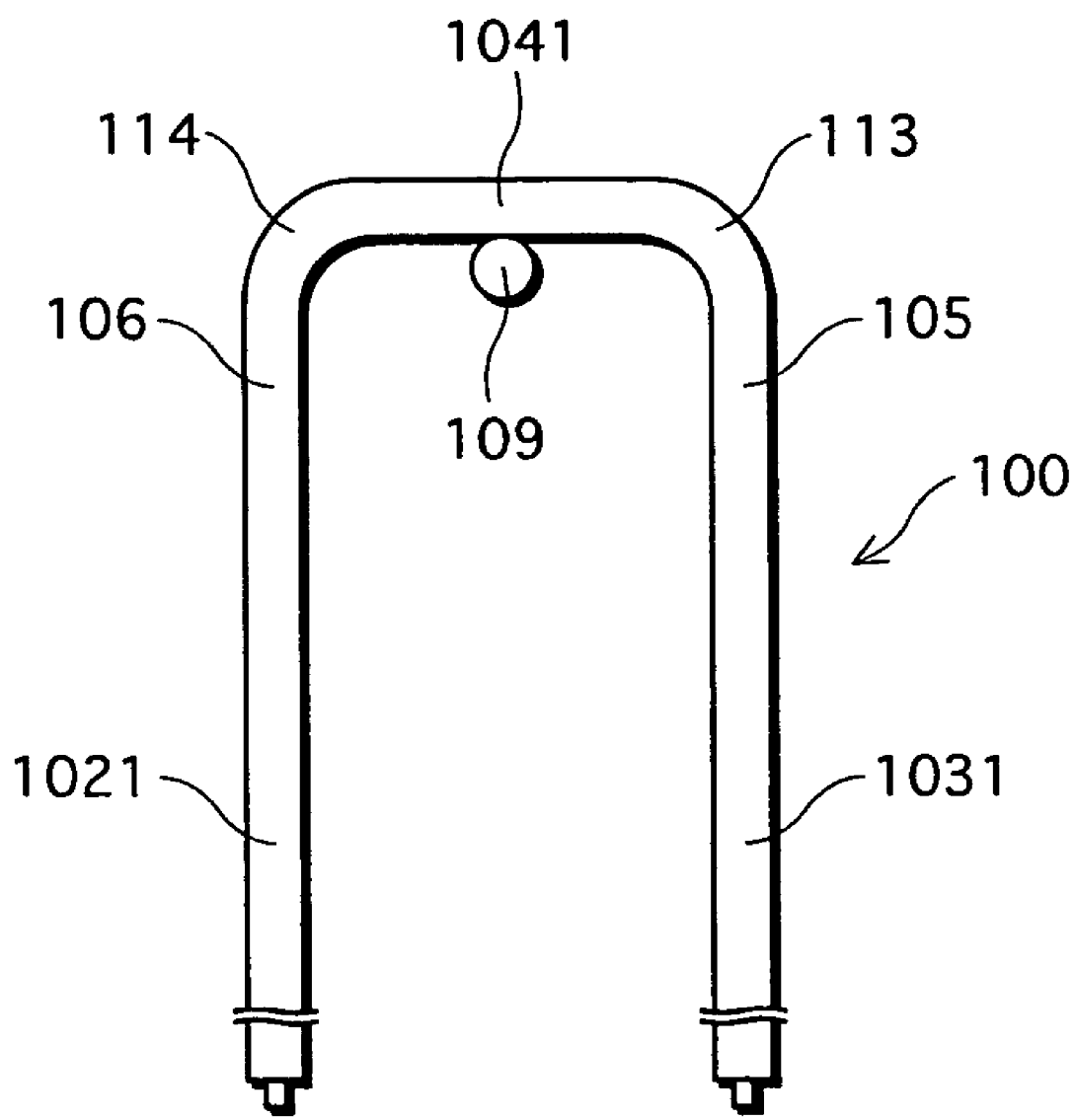
FIG. 10 shows the manufacturing process after the lamp is curved.

In the removing process, the curved lamp 100 is removed from the curving apparatus 50 as will be described later, and hung on a horizontal pole 109 as shown in FIG. 10. This process is performed using a removing apparatus that will be described later. The removing process includes: (a) removing chuck arrangement step of arranging a chuck mechanism of the removing apparatus; (b) sandwich-holding step of sandwiching and holding end portions 105 and 106 that are on the side of the linkage portion 1041 among portions of the straight tube portions 1021 and 1031, using the chuck mechanism, and moving the chuck mechanism downward; (c) inverting step of rotating the chuck mechanism by 180 degrees to invert the curved lamp 100 upside down at the lowered position; and (d) hanging step of hanging the curved lamp 100 on the horizontal pole 109.

The following describes the removing apparatus first, and then the removing process.

(3-3-1) Removing Apparatus

Figure 11:
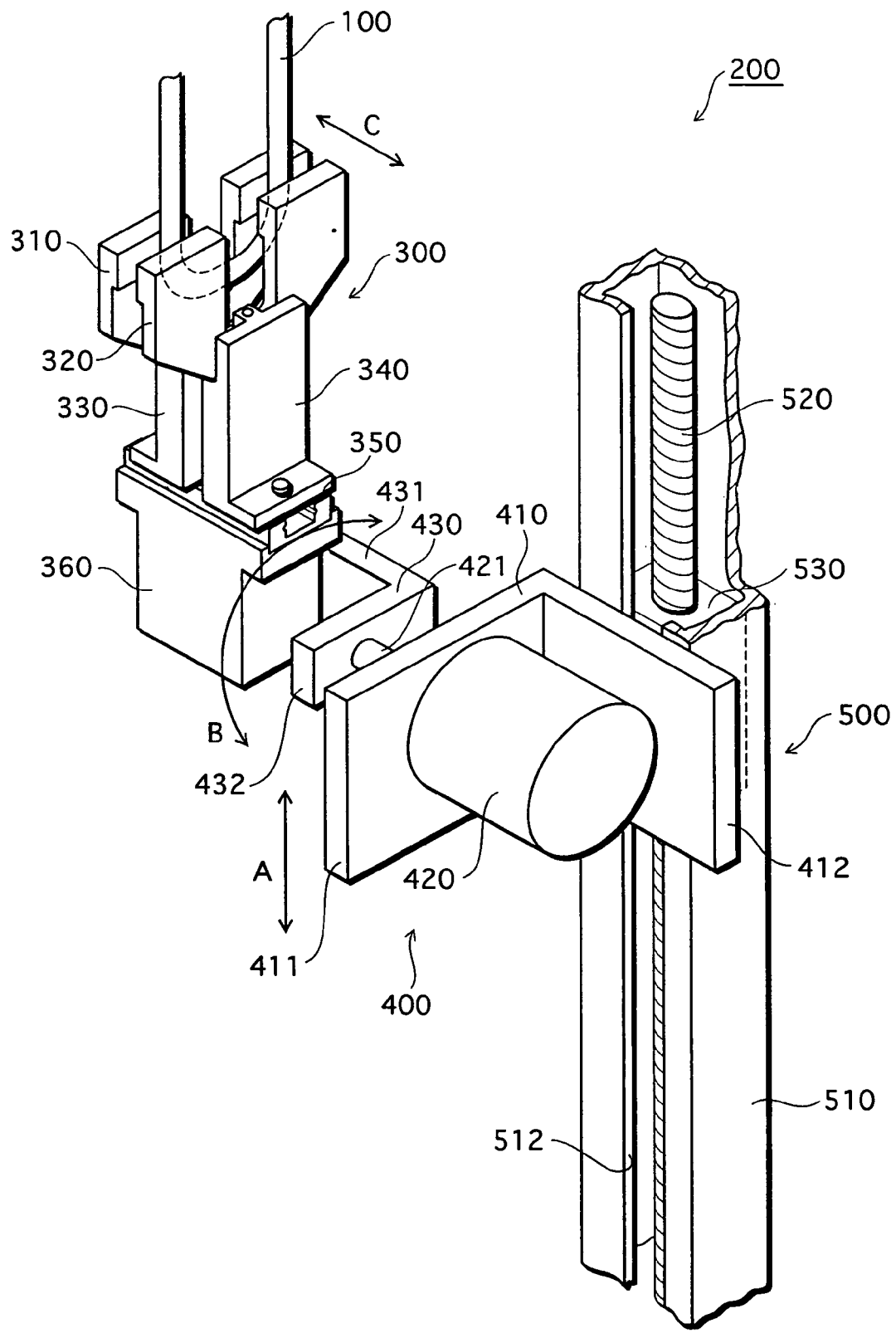
FIG. 11 is a perspective view showing an outline of the removing apparatus.

FIG. 11 is a perspective view showing an outline of the removing apparatus.

As shown in FIG. 11, the removing apparatus includes: a chuck mechanism (corresponding to the removing chuck) 300 for sandwiching and holding the curved lamp 100; a rotating/holding mechanism 400 for holding the chuck mechanism 300 and rotating while holding it; and a moving/ holding mechanism 500 for holding the rotating/holding mechanism 400 and moving in a vertical direction while holding it.

In FIG. 11, the curved lamp 100 is sandwiched and held by the chuck mechanism 300, the chuck mechanism 300 is rotated by the rotating/holding mechanism 400 to invert the curved lamp 100 upside down, and the chuck mechanism 300 is moved downward by the moving/holding mechanism 500 to move the curved lamp 100 downward.

Figure 12:
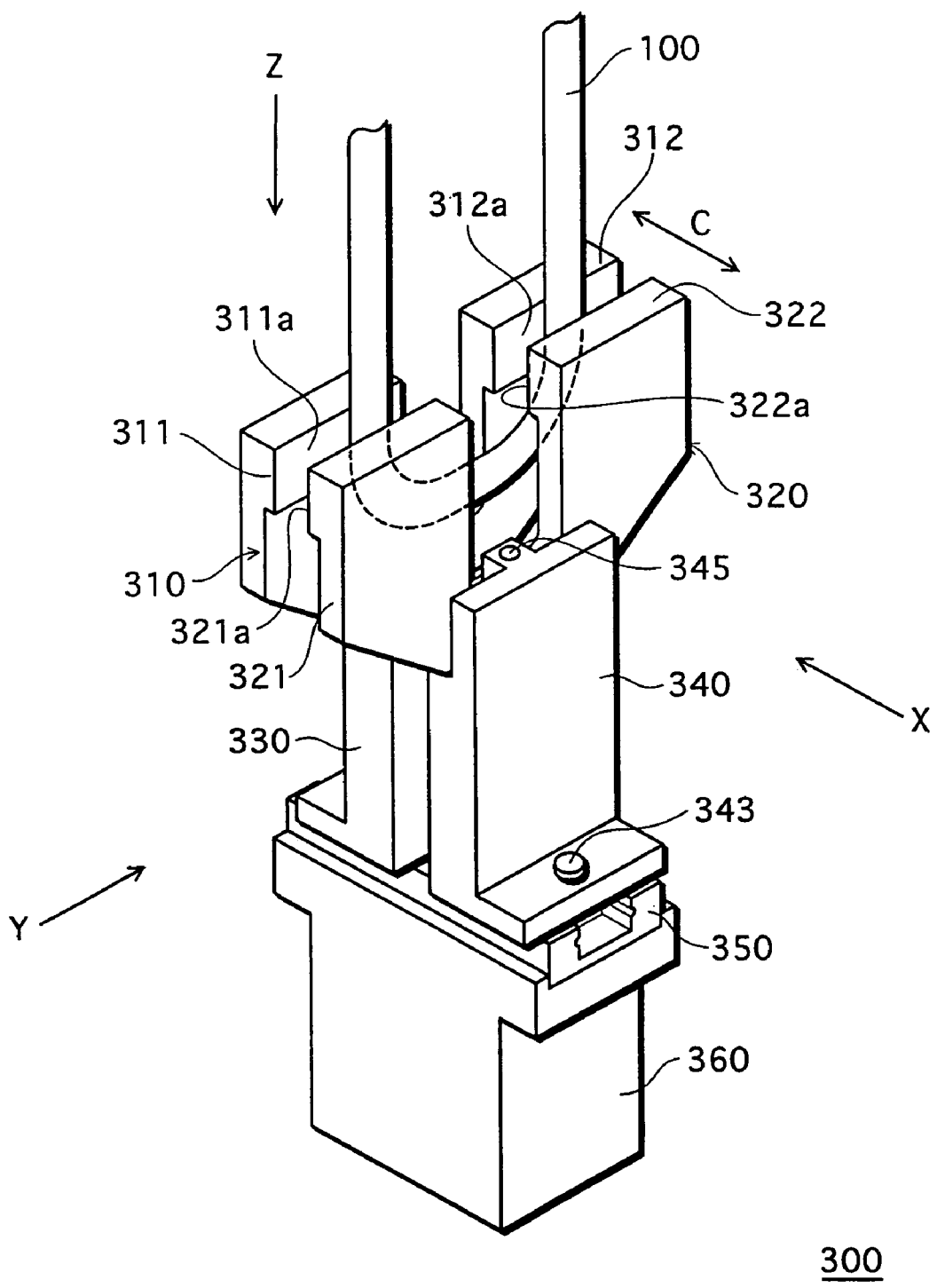
FIG. 12 is a perspective view showing an outline of the chuck mechanism.
Figure 13:
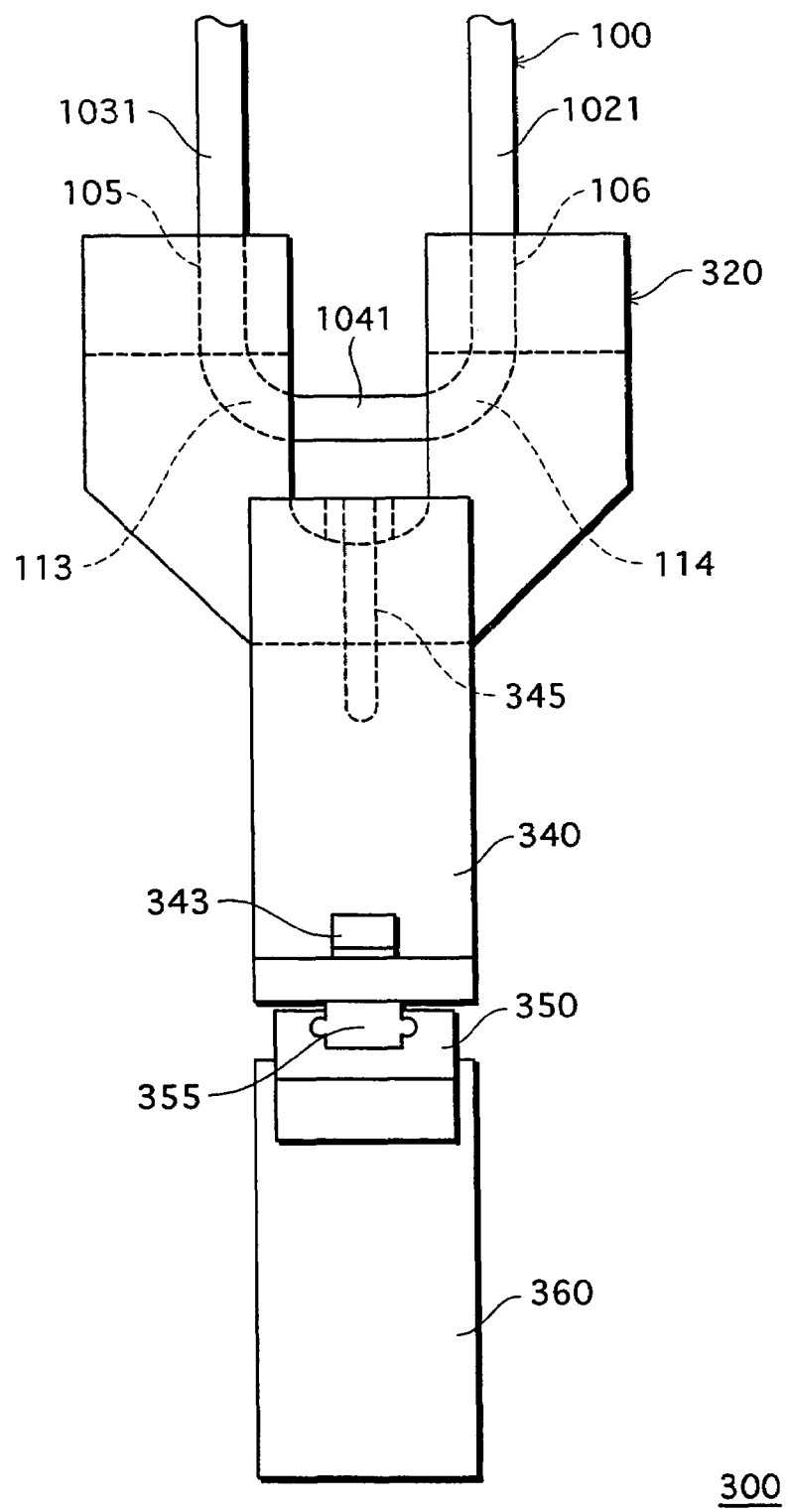
FIG. 13 is a view of the chuck mechanism viewed in the X direction indicated in FIG. 12.
Figure 14:
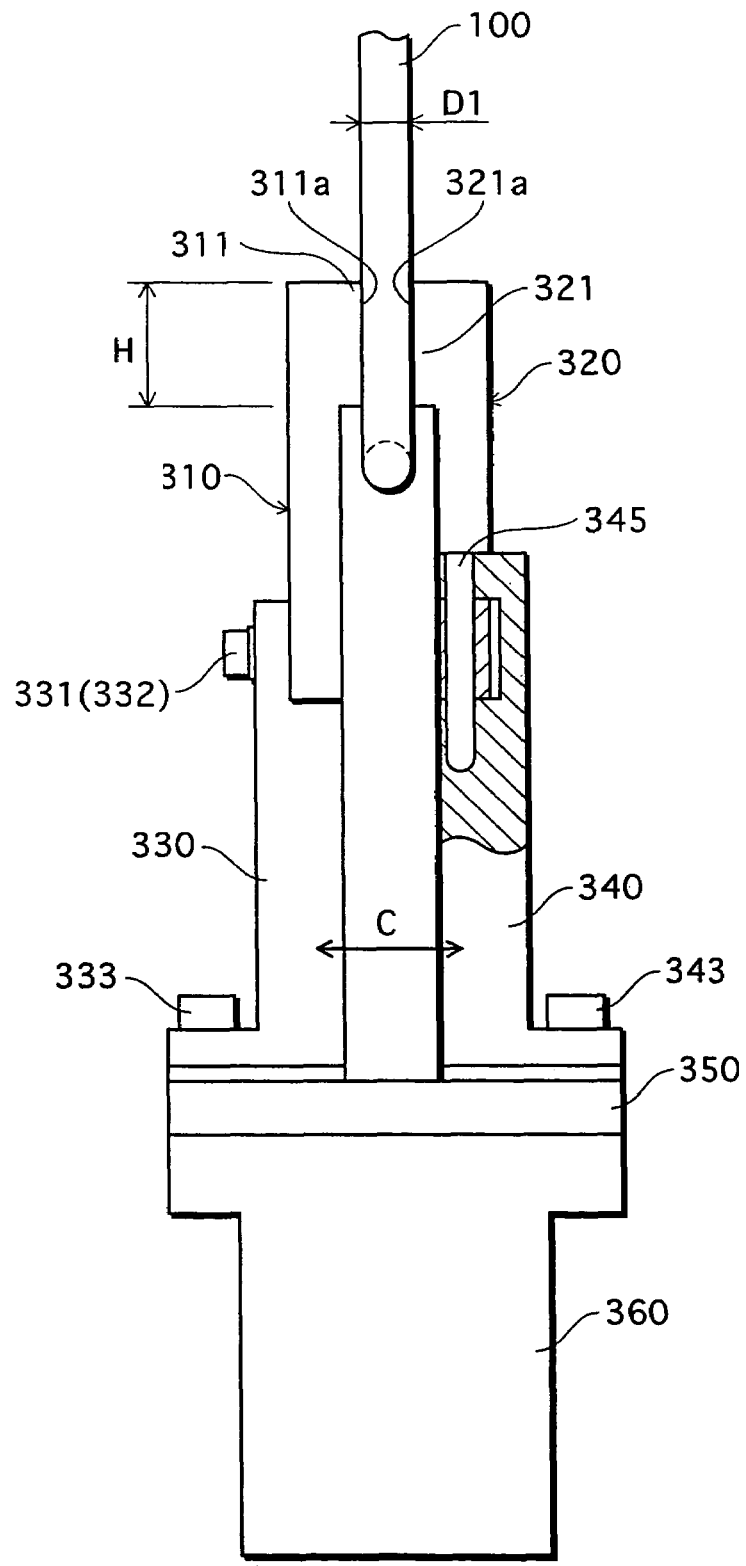
FIG. 14 is a view of the chuck mechanism viewed in the Y direction indicated in FIG. 12.

FIG. 12 is a perspective view showing an outline of the chuck mechanism. FIG. 13 is a view of the chuck mechanism viewed in the X direction indicated in FIG. 12. FIG. 14 is a view of the chuck mechanism viewed in the Y direction indicated in FIG. 12.

The chuck mechanism 300 is achieved by, for example, an air chuck. Jaws 330 and 340 (corresponding to the first base and the second base) are attached to the air chuck, and plate members 310 and 320 (corresponding to the first member and the second member) are attached to the jaws 330 and 340, respectively.

The jaws 330 and 340 are arranged to face each other, and can move away from and near to each other. When they come closer to each other, they sandwich the curved lamp 100 by the plate members 310 and 320 attached thereto.

The air chuck includes a guide member 350 and a drive unit 360. The guide member 350 guide the jaws 330 and 340 so as to move away from and near to each other in a direction (which is the C direction in FIGS. 12 and 14. The direction is referred to as "far near direction" or "sandwiching direction"). The drive unit 360 causes the jaws 330 and 340 to move away from and near to each other in the far near direction along the guide member 350. The drive unit 360 includes an air cylinder that uses a compressed air to cause the jaws 330 and 340 to move away from and near to each other in the far near direction.

It should be noted here that in this example, the chuck mechanism 300 is achieved by an air chuck that uses a compressed air. However, not limited to this, the chuck mechanism 300 may use a magnet chuck. That is to say, any drive mechanism or method may be used in so far it can move a pair of jaws away from and near to each other.

The plate members 310 and 320 are each in the shape of, for example, character U when viewed from the far near direction, as shown in FIG. 13, so that they can simultaneously hold both of the end portions 105 and 106 (also referred to as "sandwiched portions") that are on the side of the linkage portion 1041 among portions of the straight tube portions 1021 and 1031.

The upper-end portions of the plate members 310 and 320 (that is to say, two pairs of upper-end portions of two character Us facing each other) extend toward each other. The extended upper-end portions substantially simultaneously come into contact with the end portions 105 and 106 of the curved lamp 100.

The extended upper-end portions of the plate member 310 are identified as contact portions 311 and 312, and the surfaces of the contact portions 311 and 312 are respectively identified as contact surfaces 311a and 312a. Similarly, the extended upper-end portions of the plate member 320 are identified as contact portions 321 and 322, and the surfaces of the contact portions 321 and 322 are respectively identified as contact surfaces 321a and 322a.

The contact portions 311, 312, 321, and 322 are extended as described above so that when the plate members 310 and 320 sandwich the end portions 105 and 106 of the curved lamp 100, the contact surfaces 311a, 312a, 321a, and 322a do not come in contact with the curved portions 113 and 114 of the curved lamp 100, as shown in FIGS. 13 and 14. This is because the manufactured curved lamps 100 may be varied in terms of outer diameter since they are manufactured by curving the straight lamps 100a. That is to say, the plate members 310 and 320 have recesses under the contact portions 311, 312, 321, and 322 so that when the contact portions are in contact with the curved lamp 100, the plate members 310 and 320 are not in contact with the curved portions 113 and 114 of the curved lamp 100.

Of the plate members 310 and 320 making a pair, the plate member 320 is made able to incline so that its main surface can change the direction. More specifically, the plate member 320 is held by a pin 345 provided in the jaw 340 so that the plate member 320 can rotate around an axis of the pin 345. On the other hand, the plate member 310 is fixed to the jaw 330 by screws 331 and 332 (see FIG. 16).

Figure 17:
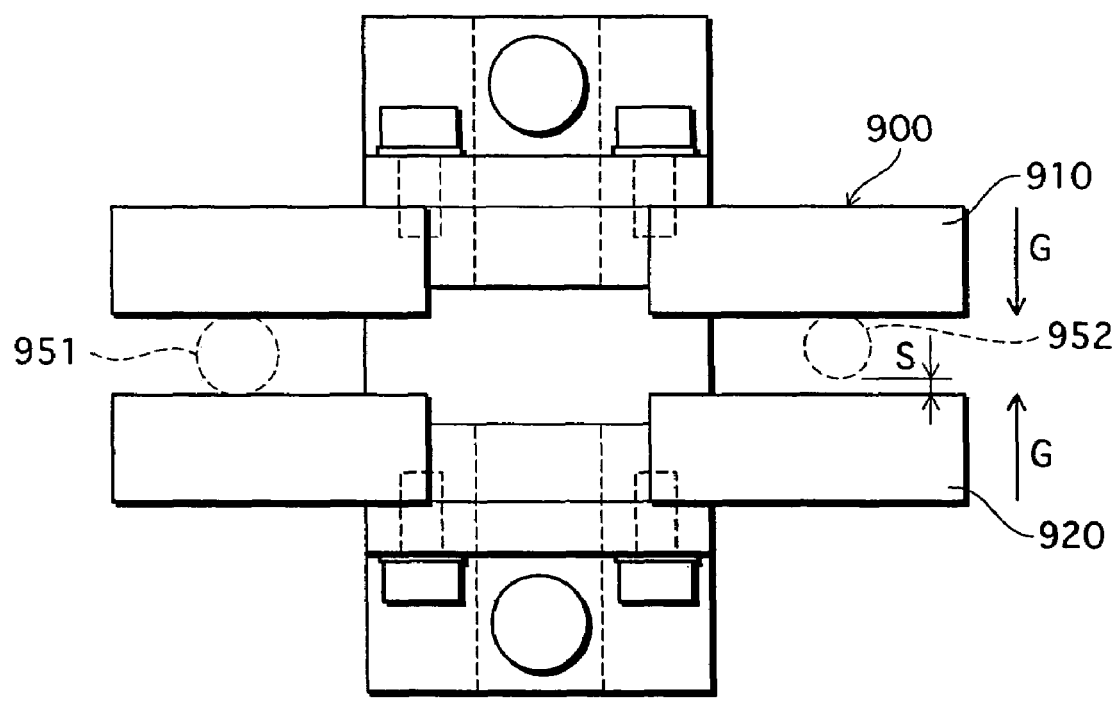
FIG. 17 is a plan view of another chuck mechanism.

This arrangement of making the plate member 320 able to incline makes it possible to hold the curved lamp in a stable manner. For example, in the case of a chuck 900 shown in FIG. 17, plate members 910 and 920 come close to each other in the G direction and sandwich a straight tube portion of a curved lamp that extends in a right angle to the plane of FIG. 17. With such a construction, there is no problem when the two straight tube portions of the curved lamp have the same outer diameter. However, in the actual manufacturing process, there may be a case where the two straight tube portions have different outer diameters, as in straight tube portions 951 and 952 whose outer diameters are indicated by dotted lines in FIG. 17. In such a case, a gap with a distance S between the plate member 920 and the straight tube portion 952 is created. When this happens, the curved lamp is held by the chuck in an unstable manner. Therefore, when it is removed from the curving apparatus, the curved lamp may collide with the curving apparatus and may be broken. The above-described arrangement of the present embodiment, in which the plate member 320 can be inclined, prevents the curved lamp from being held unstably and broken.

Back to FIGS. 12-14, the pin 345 is provided substantially in parallel with the straight tube portions 1021 and 1031. The pin 345 is positioned in the middle of the contact portions 321 and 322, and is closer to the outside of the chuck mechanism 300 than the contact surfaces 321a and 322a of the plate member 320 in the X direction. With such a construction, the pin 345 does not come into contact with the curved lamp 100 when the lamp is sandwiched by the plate members.

It should be noted here that not limited to the above-mentioned position, the pin 345 may be provided at another position in so far as an extension of the pin passes through a space between the contact portions 321 and 322 of the plate member 320 when the curved lamp 100 in the sandwiched state is viewed from the plate member 320. This is because with such an arrangement, the plate member 320 can be inclined in accordance with a difference in outer diameter between the straight tube portions 1021 and 1031.

In this example of the present embodiment, a length H (also referred to as a height H) of the contact portions 311, 312, 321, and 322, which extends in a direction in which the straight tube portions 1021 and 1031 of the curved lamp 100 extend (namely the height H is also a height of the contact surfaces), is set to approximately five times the outer diameter D1 of the straight tube portions 1021 and 1031 (see FIG. 14). More specifically, the outer diameter D1 of the straight tube portions 1021 and 1031 is approximately 3 mm, and the height H of the contact surfaces is approximately 15 mm. It should be noted here that if the height H is at least approximately three times outer diameter D1 of the straight tube portions 1021 and 1031, the curved lamp 100 is held stably.

The guide member 350 has, as shown in FIGS. 12 and 13, a groove extending in the far near direction. The jaws 330 and 340 are fixed to an inner fitting member 355 by screws 333 and 334, respectively.

As shown in FIG. 11, the rotating/holding mechanism 400 is provided with a rotation drive apparatus (motor) 420 for rotating the chuck mechanism 300. The chuck mechanism 300 is attached to a rotational axis 421 of the rotation drive apparatus 420 via an L-shaped member 430 which is in the shape of character "L". The L-shaped member 430 is attached, at one side 431 thereof, to the chuck mechanism 300, and at the other side 432, to the rotational axis 421. With this construction, the chuck mechanism 300 can rotate in the B direction.

The rotation drive apparatus 420 is attached to, for example, one side 411 of an L-shaped member 410. The other side 412 of the L-shaped member 410 is attached to the moving/holding mechanism 500.

As shown in FIG. 11, the moving/holding mechanism 500 includes: a guide member 510 that extends in a vertical direction; a movable member 530 that is provided inside the guide member 510 and can move in the vertical direction (the A direction in FIG. 11); a threaded axis 520 that is an axis with threads for supporting and moving the movable member 530; and a drive unit (not illustrated) for rotating the threaded axis 520.

The guide member 510 is rectangular in a transverse sectional view. The guide member 510 has a rectangular opening 512 extending in the vertical direction, in one side thereof. The movable member 530 is fixed to the side 412 of the L-shaped member 410 via the opening 512.

(3-3-2) Removing Process

Figure 15A:
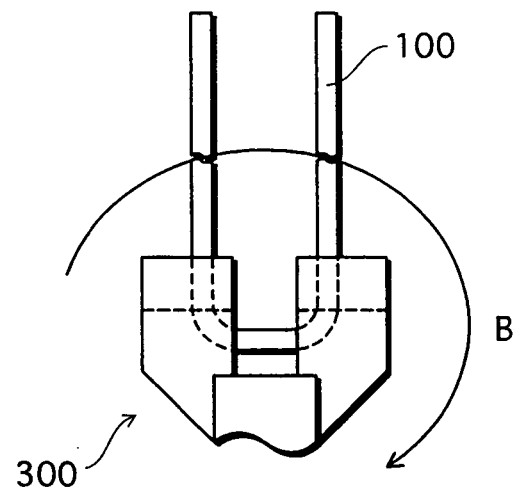
FIGS. 15A, 15B, and 15C illustrate the removing process.
Figure 15B:
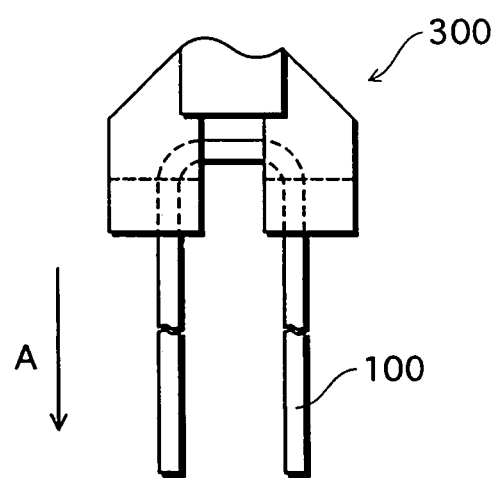
Figure 15C:
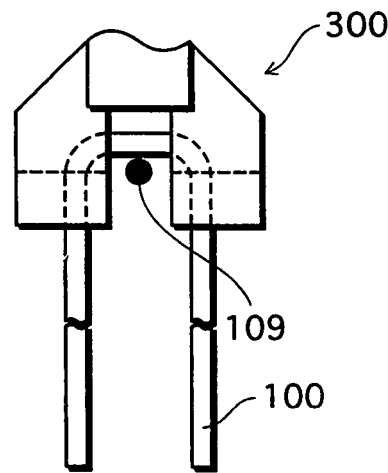

FIGS. 15A, 15B, and 15C illustrate the removing process.

Now, the removing process will be briefly explained with reference to FIGS. 15A-15C.

After the curved portions 113 and 114 of the curved lamp 100, which has been curved as shown in FIG. 5, are cooled, the end portions of the curved lamp 100 are held by a chuck (not illustrated) that is different from the above-described one, and are removed from the fixed chuck of the fixing unit 80. The chuck is then moved downward vertically by a predetermined distance. This causes the curved lamp 100 to move downward by the same distance. The chuck mechanism 300 is then moved so that the end portion 105 of the curved lamp 100 is inserted into a space between the contact surfaces 311a and 321a of the plate members 310 and 320, and the end portion 106 of the curved lamp 100 is inserted into a space between the contact surfaces 312a and 322a of the plate members 310 and 320 (the removing chuck arrangement step).

The curved lamp 100 is then sandwiched and held by the chuck mechanism 300 of the removing apparatus 200. While they are in this state, the chuck mechanism 300 is moved to a predetermined position in a predetermined direction, downward in this example (the sandwich-holding step). It should be noted here that the predetermined position mentioned above is a position where the curved lamp 100 does not come into contact with the curving apparatus when the chuck mechanism is rotated together with the curved lamp 100.

Figure 16:
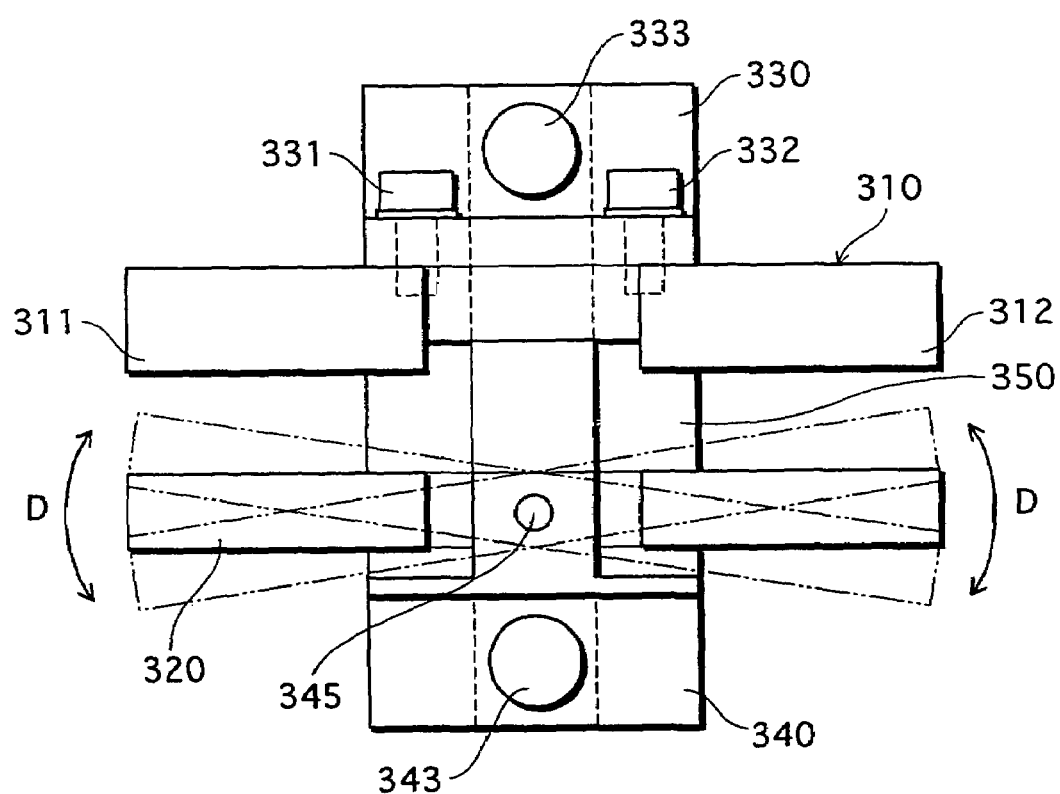
FIG. 16 shows the chuck mechanism viewed in the Z direction in FIG. 12.

FIG. 16 shows the chuck mechanism viewed in the Z direction indicated in FIG. 12.

As shown in FIG. 16, the plate member 320 can rotate in the D direction around the axis of the pin 345, which is substantially in parallel with a direction in which the straight tube portions 1021 and 1031 of the curved lamp 100 extend (the phantom lines in FIG. 16 indicate positions of the plate member 320 after rotations).

With such an arrangement, even if the straight tube portions 1021 and 1031 (the end portions 105 and 106) of the curved lamp 100 to be held by the chuck mechanism 300 are different from each other in outer diameter, the plate member 320 is inclined until it firmly comes into contact with the straight tube portions 1021 and 1031. This enables the contact surfaces 321a and 322a of the plate member 320 to firmly come into contact with the end portions 105 and 106 of the curved lamp 100, thus causing the curved lamp 100 to be held stably.

The above-described construction prevents the curved lamp 100 from being inclined when it is removed from the curving apparatus 50, preventing the curved lamp 100 from being damaged by, for example, coming into contact with the heater 64 or 74 or the like.

The chuck mechanism is then rotated by the rotating/holding mechanism 400 by 180 degrees to invert the curved lamp 100 upside down (the inverting step). The state after this rotation is shown in FIG. 15B. When it is inverted upside down like this, the curved lamp 100 does not fall off the chuck mechanism 300 since it is held by the chuck mechanism 300 firmly.

The chuck mechanism 300 is moved downward by the moving/holding mechanism 500 so that the curved lamp 100 is moved down to a predetermined position. The state after this descent is shown in FIG. 15C. The curved lamp 100 is then removed from the chuck mechanism 300 and is hung on the horizontal pole 109 (the hanging step). It should be noted here that when such a glass tube 110a that has substantially the same outer diameter at any position thereof can be used, the chuck mechanism shown in FIG. 17, for example, may be used.

4. Modifications

Up to now, the present invention has been described based an embodiment thereof. However, not limited to this, the present invention may be modified in various ways, for example, as follows.

(4-1) Curving Process (4-1-1) In the curving apparatus 50 of the above-described embodiment, for example, the driven chuck 63 and the heater 64 are held by the plate-like member 61 and are rotated together around the rotational axis 67, and the driven chuck 73 and the heater 74 are held by the plate-like member 71 and are rotated together around the rotational axis 77. However, not limited to this construction, any construction may be adopted in so far as the heating point of the glass tube changes according to the operation of curving the glass tube. For example, the driven chucks and the heaters may move separately.

(4-1-2) In the above-described embodiment, rollers are used as the driven chucks 63 and 73. Not limited to this, any holding members may be used in so far as they hold the glass tube 110a in a manner that they can move in the tube axis direction, that is to say, in a manner that they can slide relative to the glass tube 110a in the tube axis direction. For example, the rollers may be replaced with tube-like members that can hold the glass tube 110a in a manner that they can slide relative to the glass tube 110a with the glass tube 110a passed through them. Also, the rollers may be replaced with a holding member that, having a groove shaped into character U or V in the cross sectional view, supports from underneath the glass tube 110a fitted in the groove.

Also, in the above-described embodiment, a fixed chuck is used to hold the glass tube 110a substantially at its center. However, any member may used in stead in so far as it can hold a predetermined portion of a glass tube.

Figure 18:
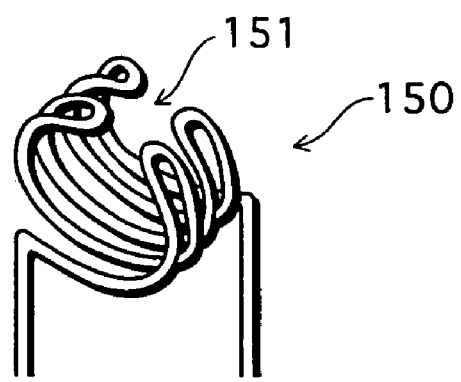
FIG. 18 shows a modification of the heater.

(4-1-3) In the above-described embodiment, heaters in the shape of coils are used. However, not limited to this, a heater 150 shown in FIG. 18, for example, may be used. The heater 150 is formed by bending a heater wire into a shape of a cylinder whose side has an opening 151, through which the planned curved portion of the glass tube is inserted into the heater 150, where the heater 150 is in the shape of character C when viewed from top of the cylinder. With this construction, it is possible to insert the planned curved portion directly into the heater through the opening 151, without letting the long straight glass tube pass through the heater until the planned curved portion is positioned at the heater. For example, if the holding member introduced in (4-1-2) above that has a groove in the shape of character U in the cross sectional view is used as the driven chuck, the glass tube can be set in both the driven chuck and the heater in the setting step only by moving the glass tube downward. This makes the glass tube setting operation easier.

Figure 19:
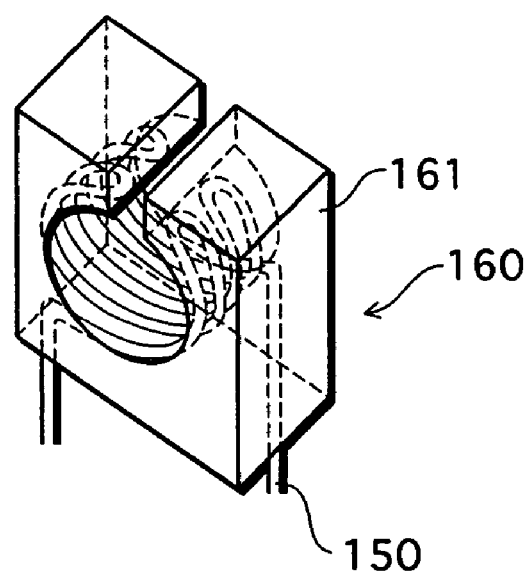
FIG. 19 shows another modification of the heater.

Also, a heater 160 shown in FIG. 19 maybe used. The heater 160 is formed by wrapping the heater 150 with a member 161 made of a heat-resistant material such as ceramics. With this arrangement, even if the heater 150 is deformed by heat, the deformation is suppressed by the member 161, thus preventing the variation in the position of the curved portion of the glass tube due to shifting of the heating position caused by the deformation of the heater over time. The shape of the heater of this modification is not limited to the cylinder which is in the shape of character C when viewed from top of the cylinder, but may be any shape in so far as the heater has an opening. For example, the heater may be in the shape of cylinder which is in the shape of character U or a concave when viewed from top of the cylinder.

(4-1-4) In the above-described embodiment, the straight tube lamp is formed into the shape of character U: that is to say, the two curved portions are formed simultaneously. However, not limited to this, the manufacturing method of the present invention can be applied to the case where one curved portion is formed or to the case where three curved portions are formed. A curved lamp with only one curved portion, namely, an L-shaped curved lamp can be manufactured by using either of the holding members 60 and 70.

(4-1-5) In the above-described embodiment, a straight tube lamp that is approximately 3 mm in outer diameter is curved. However, values of the measurement such as the outer diameter, inner diameter, length, bending radius r, or distance W of the glass tube are not limited to the above-described ones. The present invention is effective in curving such narrow glass tubes that are difficult for conventional technologies to curve.

(4-1-6) In the above-described embodiment, a straight tube lamp is curved by 90 degrees. However, the curvature angle is not limited to 90 degrees. It is possible to curve a straight tube lamp by predetermined degrees of angle such as 30 degrees or 150 degrees that conform to the format of the backlight unit in which the manufactured lamp is used, by adjusting the rotation angle of the holding members 60 and 70. It is preferable however to set the curvature angle to 30 degrees or more so as to enable a partial weight of the glass tube to be applied to the softened portions to compress them.

Also, in the above-described embodiment, to curve the straight tube lamp by 90 degrees, it is arranged that the driven chucks 63 and 73 rotate around the rotational axes 67 and 77, respectively. However, if the curvature angle is as small as 30 degrees, and if a holding member that is in the shape of character U in the cross sectional view is used instead of the driven chucks 63 and 73, the glass tube may be curved by moving the holding member itself upward linearly to a position corresponding the curvature angle of 30 degrees.

(4-1-7) In the above-described embodiment, the curved lamp 100 is manufactured by setting the straight-tube lamp 100a in the curving apparatus 50 to extend in a horizontal direction, and rotating the driven chucks 63 and 73 upward around the rotational axes 67 and 77 by 90 degrees along the vertical plane. However, based on the technological concept of the present invention of moving part of the glass tube 110a upward to enable the weight of the lifted part to be applied to the softened portions so that the softened portions are compressed and become thicker, the construction for achieving the technological concept is not limited to the above-described construction. For example, after the glass tube is set in the setting step, the end portions of the glass tube may be moved upward.

It should be noted here that the present invention may be any glass tube curving method that moves part of the glass tube and enables the weight of the moved part to be applied to the softened portions to compress them. In this sense, the glass tube curving method is not limited to the above-described method of setting the glass tube 110a to extend in a horizontal direction, and moving the driven chucks 63 and 73 upward.

For example, a straight glass tube may be curved into the shape of character L by the following method. While it is made to stand substantially vertically, the glass tube is held by a fixed chuck at a predetermined position, and held by a driven chuck at a position higher than the predetermined position. In this state, a planned curved portion, which is positioned between the fixed chuck and the driven chuck, is heated and at the same time the driven chuck is rotated downward around a predetermined rotational axis drawing an arc by 90 degrees along a vertical plane including the tube axis. In this method, as is the case with the method of the above-described embodiment, the driven chuck moves relative to the glass tube, and in the process between the start and end of the curving, the weight of the moving part of the glass tube is applied to compress the softened portion.

(4-1-8) In the above-described embodiment, a cold-cathode fluorescent lamp for a direct-below-type backlight unit is described as one example. However, the present invention can be applied to curved lamps in the shape of character L for an edge-light-type backlight unit or the like. Also, not limited to for use in backlight units or cold-cathode fluorescent lamps, the present invention can be applied generally to discharge lamps such as those having been curved spirally or into the shape of character U, in so far as they are manufactured by curving straight tube lamps that have been sealed with inside thereof being under reduced pressure. The present invention can also be applied to a low-pressure discharge lamp of a dielectrics barrier discharge type in which the first and second external electrodes are arranged at the rims of the ends of a glass bulb.

It should be noted here that optimum values for the heating temperature of the heaters, the moving speed of the holding members 60 and 70 and the like can be predetermined from results of experiments or the like in accordance with the diameter, material, or inner pressure of the glass tube, the bending radius of the curved portions or the like so that, for example, the curved portions do not get crushed, and are not limited to the specific values or value ranges provided in the above-described embodiment.

(4-1-9) In the curving apparatus 50 of the above-described embodiment, the driven chuck 63 and the heater 64 are held by the plate-like member 61, and they rotate together around the rotational axis 67. However, not limited to this, any mechanism may be adopted in so far as it enables a planned curved portion of a straight tube lamp to be curved with a predetermined bending radius. For example, a straight tube lamp can be curved by a general mechanism in which a predetermined portion of the glass tube 110a is held by a first chuck in a manner that the first chuck can move (or cannot move) in the tube axis direction (longitudinal direction) of the glass tube, one end portion of the glass tube is held by a second chuck in a manner that the second chuck cannot move (or can move) in the longitudinal direction, and the second chuck is moved in a predetermined direction or rotated around a rotational axis so that the trajectory draws an arc.

(4-1-10) In the above-described embodiment, the coil of the heater has three turns. However, it may have, for example, two turns in so far as it can keep the heating temperature. To locally heat the glass tube, it is preferable that the number of turns is small as possible. However, depending on the value of the bending radius, the coil having four turns may be used since according to the present embodiment, the coil width is as much shorter as turns of the coil can be made closer to each other than in the case where Kanthal wire is used.

The sheath heater may be constructed in any manner in so far as a heating wire, which generates heat when it receives electrical current, is covered with a metal pipe via an insulating layer (insulator). Optimum materials or values for the materials such as the heating wire constituting the sheath heater, thickness of the heating wire, number of heating wires, outer diameter of the pipe, coil width, coil diameter, number of turns or the like can be predetermined from results of experiments or the like in accordance with the heater use time, temperature at which the glass tube is heated, bending curvature or the like, and are not limited to the materials or values provided in the above-described embodiment.

Also, from the viewpoint of preventing the variation in the position of the curved portion of the glass tube due to shifting of the heating position caused by the deformation of the coil over time, the heater disclosed in the present embodiment is not limited to such lamps that were sealed with the inside thereof being under reduced pressure, but may be used to curve straight glass tubes that have not been sealed.

(4-2) Removing Process

Figure 20:
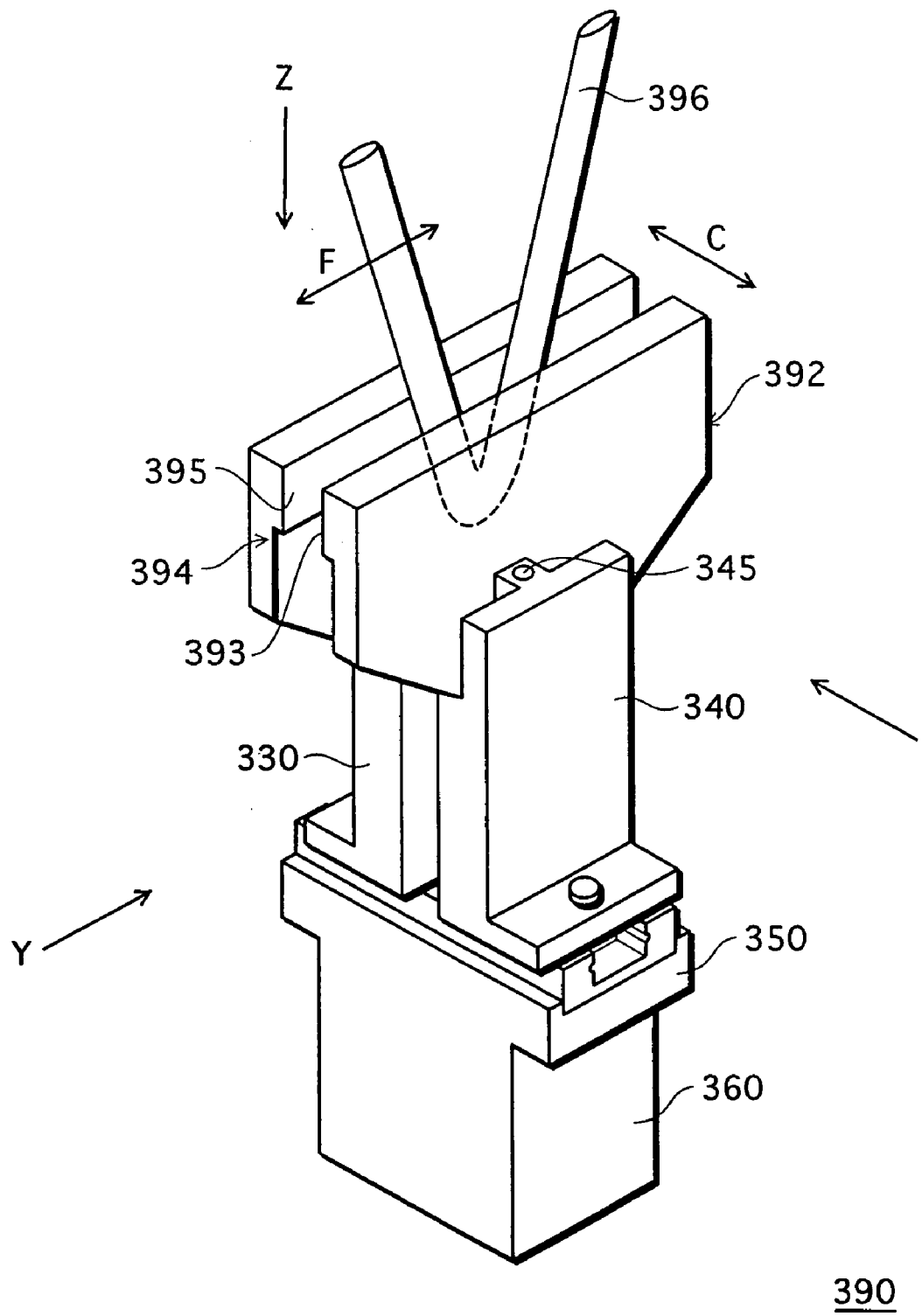
FIG. 20 is a perspective view of a chuck mechanism in a modification.
Figure 21:
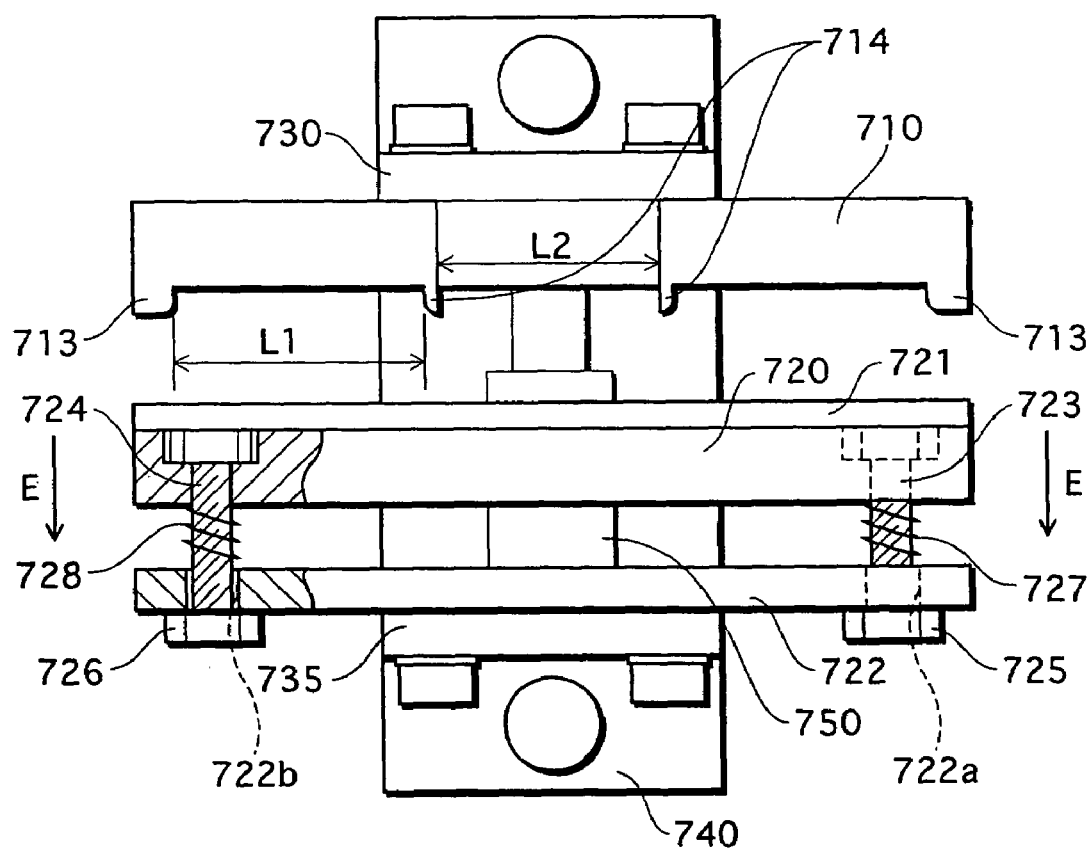
FIG. 21 is a plan view of a chuck mechanism in a modification.

FIGS. 20 and 21 show modifications of the chuck mechanism of the present embodiment.

(4-2-1) Object of Chuck Mechanism

In the above-described embodiment, the object sandwiched by the chuck mechanism is a curved lamp in-the shape of character U. However, the shape of the object is not limited to character U.

For example, as shown in FIG. 20, the object (a lamp 396) may be in the shape of character V. That is to say, the object may be in any shape in so far as it includes a pair of bar-like portions, which may extend in any directions. When the pair of bar-like portions extend in parallel with each other, the object is in the shape of character U. When the distance between the bar-like portions in a pair is wider at the ends of the curved glass tube than at the linkage portion, the object is in the shape of character V. Also, the object in the shape of character U or V may be inverted before it is sandwiched.

(4-2-2) Members

In the above-described embodiment, the plate members are in the shape of character U when they are viewed from the X direction indicated in FIG. 12. However, the shape of the plate members is not limited to this. For example, the plate members may be in the shape of a home plate as shown in FIG. 20, inverted triangle, or rectangle. In this case, not like the contact surfaces 311a, 312a, 321a, and 322a that make two pairs corresponding to the U-shaped plate members 310 and 320 (see FIG. 12), plate members 392 and 394 respectively have contact surfaces 393 and 395 having only one continuous plane for coming into contact with the object. With such a construction, if the position at which the object is held shifts in the F direction (a direction including a line connecting the bar-like portions sandwiched by the plate members), which is observed when viewed from the X direction indicated in FIG. 20, the object can be held firmly.

A pair of plate members in the shape of character U as in the present embodiment, or character V may be used in the curved lamp forming process so that the curved lamp is directly sandwiched and held by the pair of plate members in the state where the linkage portion of the curved lamp is fixed by a fixed chuck of the curving apparatus.

In this case, however, the fixed chuck of the curving apparatus needs to be inserted between the straight portions of the plate members in the shape of character U or V.

Also, in the above-described embodiment, plate-like members are used. However, not limited to this, the members may be, for example, bar-like, or block-like (in the shape of rectangular solid).

(4-2-3) Mechanism for Inclination

In the above-described embodiment, the plate member 320 is held by the pin 345 provided in the jaw 340 so that the plate member 320 can rotate around the axis of the pin 345. However, the mechanism for inclining the plate member is not limited to the above-stated one that causes the plate member rotate around the axis of a pin.

FIG. 21 is a plan view of a chuck mechanism that inclines the plate member differently from the one described in the present embodiment.

As shown in FIG. 21, chuck mechanism 700 includes plate members 710 and 720 facing each other, as is the case with the present embodiment. Of the two plate members, the plate member 710 is fixed to a jaw 730 by screws, and the other plate member 720 is attached to a jaw 735 via an attachment plate 722 such that the plate member 720 can be inclined. The jaws 730 and 735, as is the case with the present embodiment, can be moved away from and near to each other in a direction by a drive unit having an air cylinder.

The plate member 720 is attached to the attachment plate 722 by screws 723 and 724 (in the actuality three or more screws may be used) such that the plate member 720 can move in the thickness direction. The ends of the screws 723 and 724 pass through through-holes 722a and 722b and are fixed by nuts 725 and 726 to the attachment plate 722, respectively. This enables the tips of the screws 723 and 724 to protrude from the attachment plate 722 when the plate member 720 is pushed in the E direction indicated in FIG. 21.

Between the plate member 720 and the attachment plate 722, provided is a biasing means that biases the plate member 720 toward the plate member 710. More specifically, the biasing means is composed of springs 727 and 728 that are attached to the screws 723 and 724 to surround them. With such an arrangement, even if the straight tube portions 1021 and 1031 (the end portions 105 and 106) of the curved lamp 100 are different from each other in outer diameter, the plate member 720 is inclined until it firmly comes into contact with the straight tube portions 1021 and 1031. This enables the pair of plate members 710 and 720 to firmly hold the curved lamp 100.

A buffer 721, which is made of, for example, silicon rubber, is attached on the contact surface of the plate member 720. The material of the buffer 721 is lower in elasticity than the material of the plate member 720, and preferably is lower in elasticity than a material (in this example, glass) of the object to be sandwiched by the chuck mechanism. With this arrangement, it is possible to soften a shock caused to the object by the plate member 720 when the object is sandwiched. And therefore, when an object such as a glass tube is sandwiched, the object is protected from damages.

It should be noted here that in the above-described embodiment, a buffer made of silicon rubber or the like is not attached on the contact surface of the plate member since the curved lamp is sandwiched while it is still at a high temperature after it has been heated and curved. However, a buffer made of a material that resists heat at a temperature of, for example, approximately the softening point of the glass tube may be attached on the contact surface of the plate member in the above-described embodiment.

It should be noted here that the heads of the screws 723 and 724 are embedded in the plate member 720 so that the heads do not protrude from a surface on the other side of the plate member 720 facing the plate member 710. Also, in this example of the modification, the plate member 710 is in the shape of character U, as is the case with the above-described embodiment, and the plate member 720 is in the shape of a rectangle that extends in a direction including a line connecting the screws 723 and 724 (in the horizontal direction in FIG. 21).

In this example of the modification, the plate member 720 is held by the attachment plate 722 via the screws 723 and 724 such that the plate member 720 can be inclined toward the plate member 710. However, instead of this, the plate member 720 may be held by the attachment plate 722 via four screws such that the plate member 720 can be inclined toward the plate member 710. The plate member 720 of this case can be inclined with a more amount of direction than the plate members 320 and 720 of the above-described embodiment and the present modification.

When the plate member 710 is viewed from above, as shown in FIG. 21, it is found that two pairs of protrusion 713 and protrusion 714 are provided respectively at edges of the surfaces of the two straight upper end portions of the plate member 710 facing the plate member 720. The protrusions 713 and 714 have a function of preventing the sandwiched curved lamp 100 from shifting in the horizontal direction in FIG. 21 (namely, in the F direction in FIG. 20, or in a direction including a line connecting the straight tube portions). A distance L2 between the two protrusions 714 of the plate member 710 and a distance L1 between the protrusions 713 and 714 making a pair are determined according to a distance between the two bar-like portions of the object to be sandwiched.

A shock absorber 750 is provided between the jaws 730 and 735 to prevent excessive load from being applied to the two straight tube portions 1021 and 1031 when the curved lamp 100 is sandwiched. This prevents the curved lamp 100 from being broken even if there is a fear that the straight tube portions 1021 and 1031 may be broken due to its thinness. The shock absorber may be replaced with another mechanism such as a cylinder with a toggle mechanism.

(4-2-4) Bases (the Jaws in the Embodiment)

In the above-described embodiment, the jaws making a pair can move in the far near direction. However, not limited to this, another construction may be adopted. For example, one of the jaws making a pair may be fixed, and the other jaw may be made able to move away from and near to the jaw. That is to say, any construction may be adopted in so far as a pair of jaws move relatively to each other, moving away from and near to each other.

Also, in the above-described embodiment, the jaws (bases) making a pair can move linearly away from and near to each other. However, not limited to this, bases making a pair may move away from and near to each other on a circle so that the first and second members can sandwich the object.

Also, in the above-described embodiment, one member that cannot be inclined, among the two members making a pair, is fixed to a base by screws. However, the two members may be formed as one unit. That is to say, the chuck may be constructed in any manner in so far as at least one of the two members making a pair is made able to be inclined. Also, in the above-described embodiment, only one among the two members making a pair is made able to be inclined. However, an advantageous effect can be obtained if both members are attached to bases in a manner that they both can be inclined.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A curved lamp having at least one curved portion, the curved lamp being generated by heating and curving a straight glass tube that was sealed with inside thereof being under reduced pressure, wherein
    outer diameter of the straight glass tube ranges from 1.8 mm to 6.5 mm inclusive, thickness of the straight glass tube ranges from 0.2 mm to 0.6 mm inclusive, and curvature radius of an inner side of the curved portion is equal to or larger than 0.5 mm and smaller than 4.0 mm.

2. The curved lamp of claim 1, wherein
    outer diameter of the straight glass tube ranges from 2.4 mm to 5.0 mm inclusive, and thickness of the straight glass tube ranges from 0.3 mm to 0.5 mm inclusive.

3. The curved lamp of claim 1 having two curved portions and being in a shape of character U in a plan view.

4. A backlight unit having a curved lamp with at least one curved portion, the curved lamp being generated by heating and curving a straight glass tube that was sealed with inside thereof being under reduced pressure, wherein
    outer diameter of the straight glass tube ranges from 1.8 mm to 6.5 mm inclusive, thickness of the straight glass tube ranges from 0.2 mm to 0.6 mm inclusive, and curvature radius of an inner side of the curved portion is equal to or larger than 0.5 mm and smaller than 4.0 mm.

5. The backlight unit of claim 4, wherein
    outer diameter of the straight glass tube ranges from 2.4 mm to 5.0 mm inclusive, and thickness of the straight glass tube ranges from 0.3 mm to 0.5 m inclusive.

6. The backlight unit of claim 5 having two curved portions and being in a shape of a character U in a plan view.

* * * * *